(12) United States Patent
Yi

(10) Patent No.: US 8,943,113 B2
(45) Date of Patent: Jan. 27, 2015

(54) METHODS AND SYSTEMS FOR PARSING AND INTERPRETATION OF MATHEMATICAL STATEMENTS

(76) Inventor: Xiaohua Yi, Superior, CO (US)

( * ) Notice: Subject to any disclaimer, the term of this patent is extended or adjusted under 35 U.S.C. 154(b) by 627 days.

(21) Appl. No.: 13/188,090

(22) Filed: Jul. 21, 2011

(65) Prior Publication Data

US 2013/0024487 A1    Jan. 24, 2013

(51) Int. Cl.
 *G06F 3/00* (2006.01)
 *G06F 17/21* (2006.01)
(52) U.S. Cl.
 CPC .................................. *G06F 17/215* (2013.01)
 USPC ......................................................... 708/136
(58) Field of Classification Search
 USPC ................................................ 708/131–174
 See application file for complete search history.

(56) References Cited

U.S. PATENT DOCUMENTS

| | | | |
|---|---|---|---|
| 4,736,320 A | 4/1988 | Bristol | |
| 5,247,693 A | 9/1993 | Bristol | |
| 5,355,496 A | 10/1994 | Fant et al. | |
| 5,878,386 A | 3/1999 | Coughlin | |
| 6,058,385 A | 5/2000 | Koza et al. | |
| 6,101,556 A | 8/2000 | Piskiel et al. | |
| 7,165,113 B2 | 1/2007 | Karp et al. | |
| 7,272,543 B2 | 9/2007 | Estevez-Schwarz et al. | |
| 7,373,291 B2 | 5/2008 | Garst | |
| 7,636,697 B1* | 12/2009 | Dobson et al. | 706/12 |
| 2002/0126905 A1* | 9/2002 | Suzuki et al. | 382/229 |
| 2004/0015342 A1 | 1/2004 | Garst | |
| 2006/0005115 A1 | 1/2006 | Ritter et al. | |
| 2006/0085781 A1* | 4/2006 | Rapp et al. | 716/17 |
| 2008/0091409 A1 | 4/2008 | Anderson | |
| 2008/0263403 A1 | 10/2008 | Soklakov | |
| 2010/0281350 A1 | 11/2010 | Xie et al. | |

FOREIGN PATENT DOCUMENTS

WO     2011038445 A1    4/2011

OTHER PUBLICATIONS

International Search Report, PCT/US2012/047650 dated Jul. 30, 2013.

* cited by examiner

*Primary Examiner* — Tan V. Mai
(74) *Attorney, Agent, or Firm* — Holland & Hart LLP

(57) ABSTRACT

Methods, systems, and devices are described that provide for entry of hybrid mathematical and natural language statements in a mathematical notation friendly language and system for a rigorous yet practically tractable formal grammar to distill the essence of natural math notation. Hybrid statements mixing natural language and symbolic expressions including assertions, commands, queries, and/or deductions may be entered that are processed according to natural language processing. The statements, along with the math objects are evaluated, and one or more results output. Furthermore, systems may provide automatic construction of one or more solution narratives that can be beneficial to student users pedagogically.

35 Claims, 12 Drawing Sheets

METHODS AND SYSTEMS FOR PARSING AND INTERPRETATION OF MATHEMATICAL STATEMENTS

FIELD

The following relates generally to mathematical statement recognition and evaluation and more specifically to methods and systems for recognition and evaluation of hybrid statements mixing symbolic expressions and natural language including English provided in one-dimensional formats using ASCII.

BACKGROUND

Math software has been developed to perform symbolic and/or numerical mathematical computations that have been otherwise performed by humans. For educational users, such as advanced junior high school students, high school students and college students, math software tools may be used to assist in the learning process. Math software can provide efficient results for what are often time consuming and tedious tasks if performed manually. Once a student has an understanding of a process or calculation, using that process or calculation as a building block in other, perhaps more complex, calculations or processes is an important task. However, the time consuming nature of performing such a task may hinder the amount of tasks that such a student may accomplish. Thus, efficient software tools may assist in the educational process by reducing the amount of such tasks. Furthermore, such software may provide encouragement for the learning of different processes and concepts. In general, for a math software to function, a computer language is required to convert a math problem defined in natural mathematics language, which includes symbolic expressions in natural math notations, and hybrid statements mixing natural language and symbolic expressions for defining operations applicable to and relationships among mathematical entities, into an intermediate representation such as abstract syntax tree (AST) that can invoke appropriate algorithms written in, for example, other lower level languages such as C or Fortran that perform the defined mathematical computations.

The usage of math software in is still very limited especially in education, considering the vast accessibility of computers in schools and household. Many factors contribute to this phenomenon. Among them the two most important ones that are directly related to software are:

1. Disconnection between computer languages employed by math software and the mathematical language; and
2. Inadequate communication between the software and student users.

The first factor is manifested by: A) Significant differences in syntax for symbolic expressions between the computer languages employed by math software and natural math notation; and B). Lack of systematic representation of the hybrid syntax in computer languages.

Item A causes many users to spend a long time learning to use the software, creating a significant barrier to use and consequently impeding market acceptance. The impact is even worse for student users: instead of assisting, the software/devices actually complicate a student's learning because he or she is forced to navigate simultaneously two different sets of notations, one from a textbook and another for the software.

Item B makes it difficult for many users to define math problems since the expressive power of symbolic expressions is nevertheless limited beyond imperatives. Consequently, users have to decompose these problems and write procedural code to solve the problems using primitive constructs provided by the language. This is obviously not plausible for most students learning math or professional users that are not programming-savvy. In fact, it defies the purpose of mathematically-oriented languages and software. For instance, any individual able to write detailed procedural code to solve a math problem is less likely to need the help of math software in the first place.

The most noticeable inadequacy in communication between math software and its users is the lack of procedural details documenting how a problem is solved. That deficiency is more consequential for educational applications: elucidating how a problem is solved and elaborating what are the concepts behind the solution are at least as important as the answer itself. For professional users who use mathematics in their daily work, such a gap in syntaxes can impact their acceptance of the software, especially for potential new users. Such users may not have time or the desire to learn a new language.

SUMMARY

The present disclosure generally relates to one or more improved systems, methods, and/or apparatuses for parsing and interpretation of mathematical statements, including what are referred to as hybrid mathematical statements that combine mathematical notation and natural language. Embodiments disclosed herein provide a rigorous and practically tractable formal grammar to distill the essence of the following:

1). Symbolic expressions in natural math notation into one-dimensional expressions through leveling, asciilization, direct adoption and/or operator transformation, which act to minimize the syntactical gap between one-dimensional representations and two-dimensional math notation. The one-dimension representations disclosed herein provide an amount of similarity to natural math notation and cover a wide spectrum of mathematics, easing the definition of math problems for users of the systems, methods, and/or apparatuses; and 2) Some of the most common yet simple syntactic structures found in mathematics language pertinent to problem definition including assertion, command, query and deduction. Such inclusion results in a hybrid language mixing symbolic and natural languages, representing an important early step in computer "comprehension" of scientific knowledge quantitatively expressed through mathematics.

The disclosure herein also provides a unique work flow for receiving and processing one or more statements. The work flow comprises (a) an input step for receiving at least one one-dimensional statement from a user; (b) a parsing procedure, utilizing a grammar library, that operates on the received statement(s) to convert the one-dimensional statement(s) into one or more intermediate representation such as an abstract syntax tree (AST) representing mathematical expressions and the manipulations imposed on them; and (c) an interpretation procedure that evaluates the mathematical expressions embedded in the ASTs and executes the manipulations in accordance with the AST, and provides a result. In some embodiments, both the result as well as narratives similar to human-constructed solutions are provided, in a format ready for display in natural mathematical notation.

Other embodiments disclosed herein provide methodologies that enable the composition of step-by-step procedures and narratives explaining the concepts and background involved in solving math problems, for a math software that employs the above-mentioned computer language. The composition is similar to human-made solutions and thus easy to follow for users such as students.

A further aspect of the disclosure provides a computer program product comprising a non-transitory computer readable medium comprising: (a) code for receiving one or more one-dimensional hybrid statements mixing mathematical expressions and natural language; (b) code for converting, via at least one call to a grammar library, portions of the one or more one-dimensional hybrid statements into a plurality of mathematical expressions and one or more abstract syntax tree (AST) of the expressions, wherein the grammar library includes rules for performing the step of converting; (c) code for initially displaying a two dimensional mathematical expression representing the one or more hybrid mathematical expressions; (d) code for evaluating the mathematical expressions in accordance with the AST of the expressions; and (e) code for displaying a two dimensional mathematical expression representing a narrative for the evaluation of the mathematical expressions.

In one example, novel functionality is described for method for receiving and evaluating a hybrid mathematical statement, comprising: (a) receiving one or more one-dimensional hybrid statements mixing mathematical expressions and natural language; (b) converting, via at least one call to a grammar library, portions of one or more one-dimensional hybrid statements into a plurality of one or more abstract syntax tree (AST) of the expressions, wherein the grammar library includes rules for performing the step of converting; (c) evaluating the hybrid statements in accordance with the AST; and (d) performing at least one of storing and transmitting a result of the evaluation.

BRIEF DESCRIPTION OF THE DRAWINGS

A further understanding of the nature and advantages of the present invention may be realized by reference to the following drawings. In the appended figures, similar components or features may have the same reference label.

FIGS. 11A-11B are screen shots captured after exemplary one-dimensional mathematical statements are entered according to an exemplary embodiment; and FIGS. 12A-12C are screen shots captured after exemplary one-dimensional mathematical statements are entered and interpreted according to an exemplary embodiment.

DETAILED DESCRIPTION

The present disclosure recognizes that several factors contributed to the aforementioned syntax differences for mathematical expressions between natural mathematics language and the corresponding one-dimension representations, including: (1) math notation is 2-dimensional in that it uses both symbols as well as vertical positioning such as overhead and superscript to convey semantics. On the other hand, ASCII—the character set that commonly used for communication between human and computing software/devices is 1-dimensional in the sense that characters are aligned horizontally when entered; (2) The natural math notation employs many symbols including Greek letters and specially-created symbols such as and E that are not included in ASCII; and (3) The syntaxes of math notation can be context-sensitive. This combination presents a serious challenge to the development of a formal grammar that abstracts the syntactical structures, which is the core of a language usable by the software and devices.

The present disclosure provides a mathematical notation friendly language defined by a rigorous yet practically tractable formal grammar to make the one-dimension representation of mathematical expressions either appears physically similar, or is easily associable to, their forms in natural math notation. To achieve this, a variety of methods including leveling, asciilization, direct adoption and operator transformation to minimize the syntactical gap between the language and the math notation.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
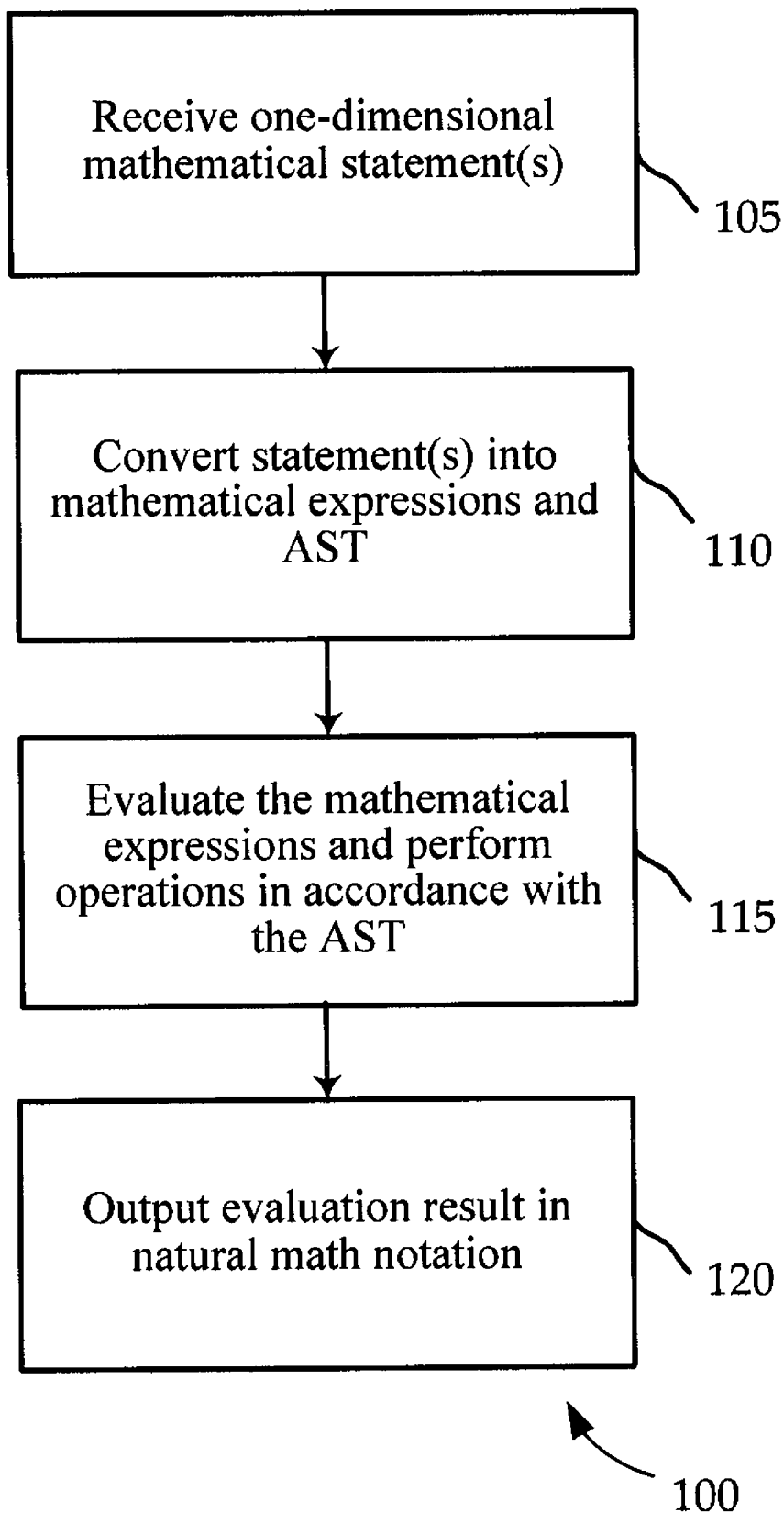
FIG. 1 is a flowchart of a method for receiving and evaluating hybrid mathematical statements according to an exemplary embodiment.

Referring first to FIG. 1, a flow chart of a method 100 according to an embodiment is described. In this embodiment, one or more one-dimensional mathematical statements are received, according to block 105. In various embodiments, the one-dimensional statements include one or more hybrid statements mixing mathematical expressions and natural language. For example, a user may enter one or more one-dimensional statements into a system using a keyboard to enter ACSII text in multiple input lines that represent one or more mathematical statements. The statements are then converted into one or more abstract syntax tree (AST), at block 110. One-dimensional statements, including hybrid statements, and conversion of such statements will be described in more detail below. The mathematical statements are interpreted in accordance with the AST, at block 115. The results are displayed in natural math notation, according to block 120.

Figure 2:
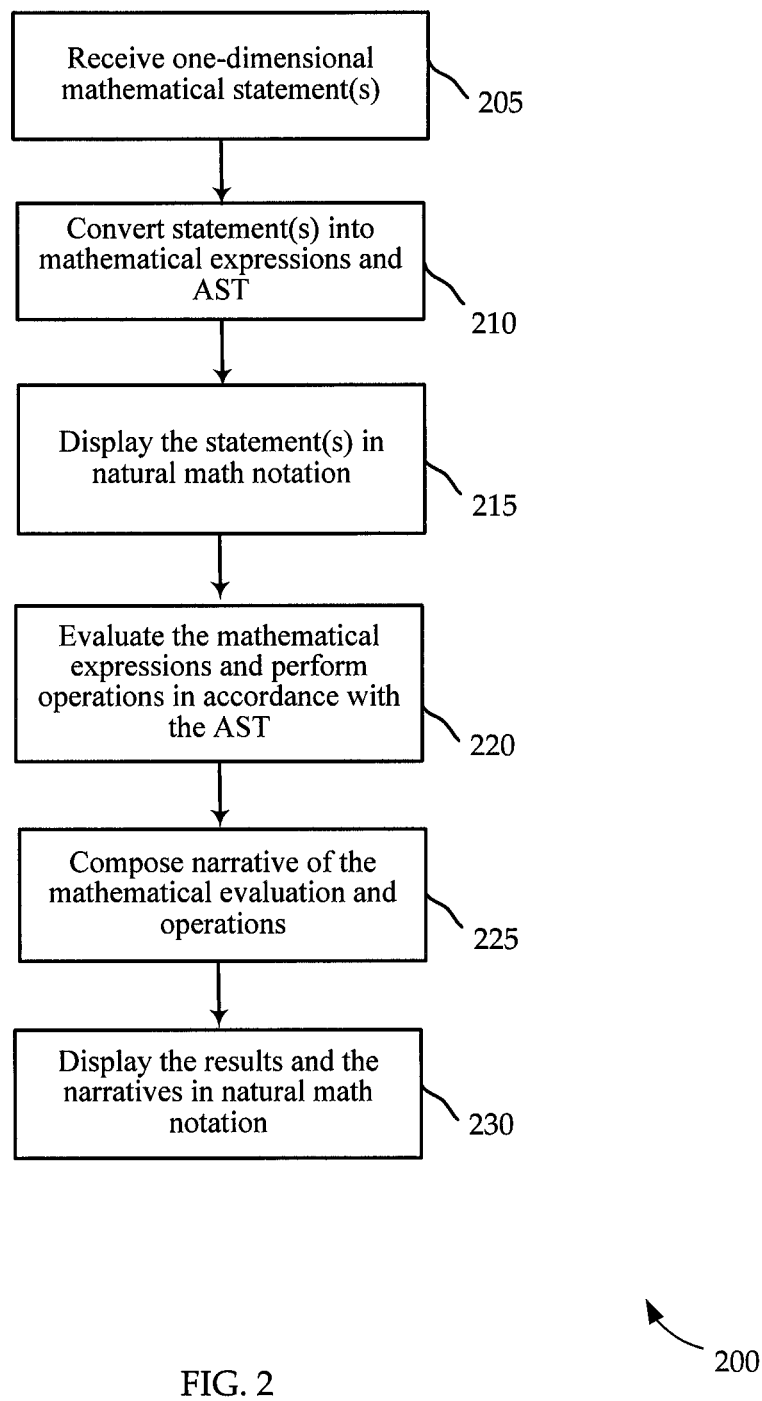
FIG. 2 is a flowchart of a method for receiving and evaluating hybrid mathematical statements according to another exemplary embodiment.

As is well understood, in many cases mathematical problems are solved in a number of discrete steps. Often, the steps that are used to solve a particular problem are as important, if not more important, than the ultimate solution to a problem. Particularly, in educational settings, the different steps that are taken to arrive at a solution are of particular importance to practice, and ensure a student has an understanding of, one or more underlying concepts and the interaction of various concepts. In some embodiments, such as illustrated in FIG. 2, intermediate results are displayed to provide a narrative of the step-by-step evaluation of a math problem. In this embodiment, one or more one-dimensional statements, including hybrid statements mixing mathematical expressions and natural language, are received, according to block 205. A user may enter one or more one-dimensional statements into a system using a keyboard, for example. The statements are then converted into one or more AST, at block 210. Mathematical statements, including hybrid statements, and conversion of such statements will be described in more detail below. At block 215, two-dimensional representations for the statements in natural math notation are displayed. In some embodiments, a user may be prompted to verify that the displayed expression corresponds to what the user intended. The mathematical statements are interpreted and mathematical operations are performed in accordance with the AST, at block 220. Narratives are composed accompanying the interpretation of statements according to block 225. The results of the interpretation and narratives are displayed in natural math notation, according to block 230. Again, the display of step-by-step problem solving narratives may assist a user in understanding various mathematical concepts.

As mentioned above, mathematical notation is often two-dimensional in nature, since it not only relies on symbols themselves but also their relative positions (superscript, subscript, overhead, etc.) to convey semantics, whereas default computer code written in ASCII set is one-dimensional, i.e., all characters are aligned horizontally, which can provide an obstacle to providing a user friendly and highly functional mathematical application in situations where it is more convenient for a user to enter information using ASCII characters. Additionally, math notation routinely employs many characters such as Greek letters for variables and constants ($\pi$ for example), and some of the letters are given special meanings. For example, $\Sigma$ is used for summation and $\Pi$ is used for product. Math notation also employs symbols particularly designed for mathematics, such as $\int$ for integration, $\partial$ for partial differentiation, and $\nabla$ for gradient operator for vector field. Furthermore, even if input were available to accommodate all sorts of math symbols that are not included in ASCII, and templates for all sorts of position-dependent structures (power, limit, integration, etc.), a formal grammar would be needed in order to capture the rich syntaxes of mathematical language. The syntaxes of mathematical language are far more complicated then what present day computer languages are capable of expressing directly, whose expressive capacity is usually limited to arithmetic operations ($\pm$, $\times$, $\div$) and common control structures (loop, if/else construct, etc). Many applications have formula editors, but these applications generally require cumbersome navigation of menus and selection of particular expressions, and provide simply a display of the particular expression without problem solving capability. The presence of a formal grammar and language to receive and evaluate relatively complex mathematical expressions is not known to exist currently. Fortress, a language being developed by a group of computer scientists of Oracle, represents some recent efforts by the IT industry and the government (Fortress is originally sponsored by DARPA). However, it appears that the designers of the language are more interested in developing new and logical notation for parallel processing, such as using $\Sigma \langle \ldots \rangle$ for pre-fix parallel summation, rather than accommodating the existing, well-established notation evolved during the past several hundred years into a computer language.

Another obstacle to providing a user-friendly and still highly functional grammar for mathematical expressions is the context-dependent character of many symbols and expressions. A common perception about mathematical language is that it is precise. While this is largely true, it is also well known that, just like natural language, it can sometimes be context-sensitive in that one symbol may have multiple interpretations according to its context, i.e., its neighboring symbols. Such context-sensitivity needs to be addressed in any language that tries to capture the essence of natural mathematical notation.

The present disclosure provides that mathematical expressions be input through ASCII characters, and no other character set such as Unicode is included as an input option in various embodiments. This constraint requires that the aforementioned three obstacles be explicitly taken into consideration. The approaches and syntaxes used to solve these problems include several novel features. Exemplary methods employed include leveling, asciilization, and adoption and operator transformation. The leveling technique refers to the transformation that makes two-dimensional math structures one-dimensional by placing superscript, subscript and overhead symbols that decorate another symbol to normal positions in manner that is intuitive for users to form a connection to the corresponding natural math notation.

One example of the application of leveling is the expression for definite integral. It is two dimensional due to the existence of upper and lower bound defining the integral. In exemplary embodiments, the bound can be expressed using a notation for range, "a<x<b". Additionally, rules are required for where to place such a range and how to link to the indefinite integral. In one embodiment, the expression "$f(x)dx" is used to express an integration function. Exemplary expressions are included below in Table 1. With respect to the range notation, this can be placed after the integration sign or at the end of the definition of the indefinite integral. In one embodiment, this statement is placed after the indefinite integral, and the symbol "@" is introduced to separate the indefinite integral and the integration domain. Leveling techniques has also been used to represent family of what we called postfix unary operators that are formed by placing operator symbols after the symbol ^ indicating the operator is positioned on the shoulder or above the operand, such as ^^ (vector normalization), ^. and ^.. (Newton's notation), ^', ^" and f^(n) for Lagrange's notation. A favorable side-effect of having a dedicated representation for the Lagrange notation is that x' can be used for a variable loosely related to x, which can be useful for applications such as coordinate transformations and those involving Green's functions. The treatments for limit, summation and product are similar, as shown in Table 1. Note that "^-" is a postfix unary operator that means less than but infinitely close to a variable when placed after that operator. That is very convenient in expressing a fundamental concept in calculus, namely the limit:

$$\lim(f(x))@(x->a^-)$$

Also note that in Table 1, f^(n)(x) means the $n^{th}$-order derivative of f(x) w.r.t. x when n≥1; f^n(x) means the n-th power of f(x) with f^−1(x) being reserved for the inverse of f, where f is a function.

The ascillization technique is used to decrease the difference between the computer language and natural math notation associated with the lack of special characters/symbols. In this technique, embodiments simply use ASCII characters or strings to represent the special symbols through some sort of connection. One type of connection is through phonetics. The representations of Greek letters are based on this connection.

Another connection is based on visual or calligraphic similarity. Examples include using $ to represent elongated-s symbol ∫ for integration, and { to represent belong-to symbol ∈. The other connection used in asciilization is the wording of what the symbol symbolizes. That is what is used in representing the summation (Σ) and product (Π) through "SUM" and "PROD". The representations of a few special functions such as Bessel and Dirac delta-function are also fall into this category. As shown in the syntax summary table, several options for representing derivatives are provided. One option is based on leveling/asciilization, which expresses du/dx, $\partial^2 f(x,y)/\partial x \partial y$ as "du/dx", "d^2f(x,y)/dxdy" respectively. One advantage of this representation is that the differentials (du, dx) can be treated as, at least for first-order derivatives, algebraically manipulable symbols. This advantage can be con-venient to symbolic manipulations in certain applications such as solving differential equation by separation of variables.

TABLE 1

Summary of math notation and corresponding one-dimensional expressions

| Math notation | One-Dimensional Expression | Technique |
|---|---|---|
| α, β, γ, . . . | alpha, beta, gamma, . . . | Asciilization |
| ∫, ∂, ϵ, π, ∞, . . . | $, d, {, pi, inf, . . . | Asciilization |
| $\lim_{x \to \infty} f(x)$ | lim(f(x) @(x - > a) | Leveling |
| $\int_{x=a}^{b} f(x) dx$ | $f(x)dx @(a < x < b) | Leveling |
| $\int_{x=a}^{b} \int_{y=g(x)}^{h(x)} f(x, y) dx dy$ | $$f(x, y)dxdy@(a < x < b, g(x) < y < h(x)) | |
| $\sum_{i=1}^{m} ..., \prod_{j=0}^{n} ...$ | SUM(. . .) @(0 < i < m), PROD(. . .) @(0 < j < n) | Asciilization |
| ∇ f (x, y, z) | {grad\|del\|nabla}(f(x, y, z)) | Asciilization |
| ∇ × f (x, y, z) | {grad*\|del*\|nabla*}f(x, y, z)\|curl(f(x, y, z)) | Asciilization |
| ∇ · f (x, y, z) | {grad.\|del.\|nabla.}f(x, y, z)\|div(f(x, y, z)) | Asciilization |
| A × B | A * B | Asciilization |
| A · B | A · B | Adoption |
| $f(x) = \begin{cases} g(x), & \text{if } x \leq 1 \\ h(x), & \text{if } x > 1; \end{cases}$ | f(x) = g(x), {if \| for \| when \| space} x <= 1<br>      = h(x), {if \| for \| when \| space} x > 1; | Leveling, unfolding |
| $A = \begin{pmatrix} a & b & c \\ e & f & g \end{pmatrix};$ | A = ( a  b  c )<br>    ( e  f  g ); | Leveling, unfolding |
| <expr> = <expr> (1.1) | <expr> = <expr> (1.1) | Adoption |
| $\frac{\partial^2 f(x, y)}{\partial x \partial y}$ | d^2f(x, y)/dxdy | Leveling |
| $\frac{\partial^2 f(x, y)}{\partial x \partial y}$ | (d/dx)(d/dy)f(x, y) | Operator transformation |
| x', y', z' | x', y', z' | Adoption |
| f'(x), f''(x), f^{(n)}(x) | f^'(x), f^''(x), f^(n)(x) | Leveling |
| f̈, f⃛ | f^.., f^... | Leveling |
| C*, a+, a− | C^*(conjugate/adjoint op), a^+, a^− | Leveling |
| î, ĵ, k̂, Â | i^, j^, k^ (basic vecs), A^ (unit vec) | Leveling |
| !, \|A\|, \|\|A\|\|, P(B\|A) | !, \|A\|, \|\|A\|\|, P(B\|A) | Adoption |
| $a_i$ | a_i, a single symbol, or a[i] for 1D array | Leveling |
| $a_{ij}$ | a[i][j], a is 2D array, matrix or tensor | |

Figure 3:
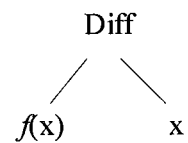
FIG. 3 illustrates an exemplary hierarchical structure of traditional operator for derivatives as a binary operator.

Another option of representing derivatives is through what is referred to as operator-transformation. This is explained as follows. First, note that taking derivative of a function f(x) with respect to a variable x can be viewed as the result of applying a binary operator to its two operands: one is the function, another is the variable differentiated against, as illustrated in FIG. 3. In this embodiment, and naming the operator Diff, the derivative can be expressed as "Diff(f(x), x)" in prefix notation. This approach is also extended to higher order derivatives, with the syntax nested. For example, a second-order derivative becomes "Diff(Diff(f(x,y),x),x)".

The notation d"f(x)/dx" represents the quotient and recursive characteristics of derivative. The quotient nature is preserved by the fraction symbol (the horizontal dividing line or the forward slash in linear style), the number of recursive limiting operations is indicated by the superscript as appeared in the denominator immediately following the infinitesimal operator. In some cases an expansion may be performed on the compact notation and expressed as:

$$\frac{d^n f(x)}{dx^n} = \frac{d}{dx}\left(\frac{d^{n-1} f(x)}{dx^{n-1}}\right) = \frac{d}{dx}\left(\frac{d}{dx}\left(\frac{d}{dx} \cdots \left(\frac{df(x)}{dx}\right) \cdots \right)\right)$$

where each pair of parenthesis is associated with one differentiation and thus the number of the pairs are the same as the order of derivatives. One embodiment simply applies the simple leveling technique to express the derivative as below $$\frac{d^n f(x)}{dx^n} \longleftrightarrow d/dx(d/dx(d/dx(\ldots(df(x)/dx)\ldots))).$$

The syntax is a little difficult due to the distant pairing of parentheses, and another embodiment uses a variation of the above syntax:

$$\frac{d^n f(x)}{dx^n} \longleftrightarrow (d/dx)(d/dx)(d/dx) \ldots (d/dx)f(x) \longleftrightarrow (d/dx)^n f(x)$$

$$\frac{\partial^n f(x_1, x_1, \ldots x_m)}{\partial x_i \partial x_j \ldots \partial x_l^p \ldots} \longleftrightarrow (d/dx_i)$$

$$(d/dx_j) \ldots (d/dx_l)^p \ldots f(x_1, x_1, \ldots x_m).$$

Figure 4:
FIG. 4 illustrates an exemplary transformation of traditional operator for derivatives into an unary operator with variable being differentiated absorbed by the operator.

In essence, the technique used above to level the derivative is operator-transformation. It is so-named because it changes the binary operator implied by the notation dg(x)/dx to a unary-prefix operator, where g(x) can be a function resulted from differentiation, namely, itself a derivative, as illustrated in FIG. 4. This representation is efficient for expressing complex expressions involving derivatives such as summation and power of differentiation expressions like (h∂/∂x+w∂/∂/y)$^n$f(x,y) that used in Tyler expansion, or mixed expressions like or ∂/∂r(r∂/∂θ)Ψ(r,θ) that frequently appear in differential equations. As can be seen, the operator "d/dx" can be used to denote both partial and ordinary derivatives. The function or expression being differentiated provides the needed context to differentiate the two cases. Furthermore, this representation is convenient for automatic generation of difference equations, a rather laborious and error-prone task for numerical solution of differentiation equations. In addition, embodiments recognize Lagrange notation and Newton's notation (for time derivatives), as indicated in Table 1.

Another technique used by present disclosure to decrease the syntactic difference between the language and math notation is adoption, i.e., directly borrowing the notation used in mathematics. The single most important example in this category is equation labeling and referencing, which greatly reduce the clutter in statements that is common for existing major math software. Other examples include usage of prime ' following a variable to indicate some sort of connection between the primed variable and the un-primed one, which are commonly used in coordinate transformations and Green's functions. Vertical bracket | . . . |, norm operator ∥ . . . ∥, and dot product are also examples of direct adoption.

To establish the language with the syntactical choice discussed above, it is necessary to have a formal grammar to abstract the syntactic structure of the language. For this purpose, a context-free grammar is constructed and a scanner and parser are developed, along with an interpreter for the language, which takes the intermediate representation generated by the parser as its input.

In one embodiment, a context-free grammar is selected with only one look-ahead symbol and statements that are parsed from left to right. However, as mentioned above, another aspect of the present disclosure is context sensitivity. A brief review of the definition of context-free and context-sensitive grammars, as well as what context-sensitive means, is provided. A formal grammar must have four elements: a set of non-terminal symbols V, a set of terminal symbols T, a set of grammar rules or production rules P and a starting symbol S to initiate the deviation of the language. If an additional constraint is added on the production rules that requires that the left side of each production rule to be a single non-terminal symbol, i.e., $$A \rightarrow (V \cup T)^*$$

where * is the Kleen star operator, indicating zero or more of the elements belongs to the set it decorates. Then, the grammar is called a context-free grammar. Notice that there are no symbols around A, namely, the production rule for A that dictates how A is re-written, does not depend on its context, hence the name of context-free.

On the contrary, the production rules of context-sensitive grammar have the following form:

$$\alpha A \beta \rightarrow \alpha \gamma \beta$$

In the above rule, $\alpha, \beta \in (V \cup T)^*$, $A \in V$, $\gamma \in (V \cup T)^+$, where + in the is the Kleen plus operator, indicating one or more of the elements belongs to the set it decorates. It seems that, from the above definitions, there is no direct link between whether the grammar is context-free and whether the interpretation can be context sensitive. As is well known, it is not desirable in a programming language to have ambiguities, i.e., multiple interpretations are possible from one statement or expression. As is also well known, ambiguities are not uncommon in natural languages such as Chinese and English. Ambiguities occur if multiple parse trees can be generated by a parser from a single sentence or statement using the chosen grammar. The assumption is that a parse tree of a statement/expression disassemblies the sentence into clearly defined structural units, from which a decisive interpretation can be obtained. It should be noted that context-dependency will not cause problem as long as the dependency can be resolved. This is indeed the case for embodiments herein. In one embodiment, the context-dependency is exclusively associated with operators. Namely, the interpretation of some of the operators depends on their context, i.e., their operands. Some concrete examples follow.

One example is the binary operator "x", which is represented by ASCII character "*". Its context-dependency can be resolved by the types of its operands: when both operands are vectors, it means cross product; when one of the two operands is a vector, it defines a multiplication that results in a new vector with components multiplied by the scalar; and when both are scalars, it is the usual multiplication operator. Another example is the vertical brackets | . . . | that is used as an unary prefix operator. Just like in natural mathematics notation, its interpretation depends on its operand: when the operand is a vector, the pair of brackets means the length of the vector; when the operand is complex number, it means the magnitude; when the operand is a matrix, it means determinant; and for numbers, it simply means the absolute value. The usage of curly bracket "{" is another example, which has two applications. When paired with a right curly bracket "}", it defines a set through list or set-builder notation. Additionally, it can also represent ∈—the belong-to set operator in natural math notation. The multiple meaning is resolved during parsing purely based on syntax, namely it is resolved by the grammar itself, instead of being resolved through context using semantic information during execution. Fragments of the grammar rules involving "{" are listed below:

<set>→{<set content>}
<relation>→<expression><relation op><expression>
<relation op>→{|>| . . .

Figure 5:
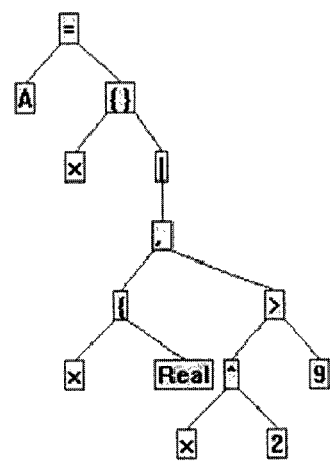
FIG. 5 illustrates an exemplary hierarchical structure of set definition through set-builder notation.

The abstract-syntax-tree representing statement in natural math notation $A=\{x|x\in \Re, x^2>9\}$ is displayed in FIG. 5. The hybrid statement for this notation would be "$A=\{x|x\{Real, x^2>9\}$". The set qualifying sign | is necessary to differentiate the set-builder notation from the list notation used for defining sets.

Thus, the disclosure provides a number of syntaxes, summarized in Table 1, that possess similarity to natural math notation and cover a wide spectrum of mathematics. Since the syntax is close or easily associable to natural mathematics, student users may focus on learning mathematics and professional users may focus on analyzing problems rather than learning a new language to solve problems.

As explained earlier, natural mathematical language comprises hybrid statements that mix symbolic expressions and natural language such as English, to describe the manipulations on, or relationships among, mathematical entities such as functions and matrices. Lack of representation of such hybrid statements in computer languages designed for mathematical applications is one of the major drawbacks identified. The present disclosure provides a number of the most common syntactic structures found in mathematical language, which are summarized in Table 2. As seen in Table 2, four general categories of declaratives are provided, namely "assertion," "command," "query," and "deduction." The inclusion of these syntactic structures greatly enhances the declarative power of the language such that users can focus on defining the math problem to be solved instead of imperative instructions on how the problem should be solved. This capability provides significant pedagogical value to student users, and may also improve the productivity of other users.

TABLE 2

Summary of hybrid syntactic structures in natural language and symbolic expressions

| Syntactic Structures | | Example |
|---|---|---|
| Assertion | a-statement | A is a 4 * 4 upper-triangular matrix; |
| | the-statement | P is the tangent plane of S at x = a, y = b; |
| | descriptive-statement | f(x) is differentiable at x = 0; |
| Command | | Calculate the distance between B and P; Solve x, y from (1.1), (1.2); |
| Query | | Is f(x) continuous over 0 < x <= 1? |
| Deduction | | Given\|Assuming <Assertions>, show\|prove <Assertion>; |

Figure 6A:
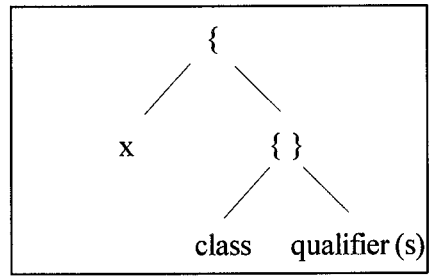
FIGS. 6A-6C illustrate exemplary hierarchical structures of assertion statements.
Figure 6B:
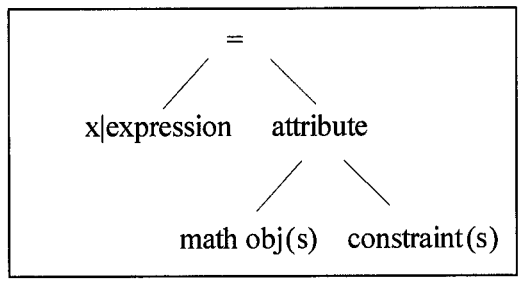
Figure 6C:
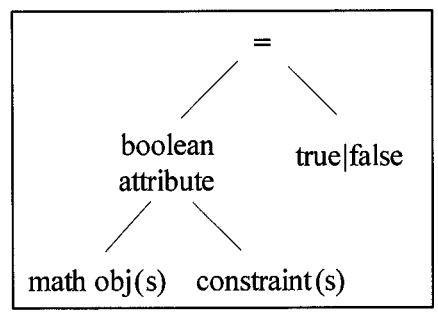

The Assertion declarative structure includes three different types of statements, namely a "is a" assertion, referred to as a-statement in Table 2, which has a hierarchal structure illustrated in FIG. 6A. Such a statement defines a particular object (A in the example of Table 2) as having certain properties or characteristics (a 4*4 upper-triangular matrix in the example of Table 2). As can be seen, the "a-statement" is treated as a "belong to" relation for set elements, whereas the "the-statement" is treated as an assignment, where "attribute" denotes a function meaningful for the involved math entities. An assertion may also have the form of a "is the" assertion, referred to as the-statement in Table 2, which has a hierarchal structure illustrated in FIG. 6B. Such a statement defines a particular object (P in the example of Table 2) as being a particular property (tangent plane of S at x=a, y=b in the example of Table 2). It is treated as an assignment, where "attribute" denotes a function meaningful for the involved math entity(ies). An assertion may also have the form of a "descriptive" assertion, referred to as descriptive-statement in Table 2, which has a hierarchal structure illustrated in FIG. 6C. Such a statement describes a particular object or function (f(x) in the example of Table 2) as having a certain characteristic or property (is differentiable at x=0 in the example of Table 2). The "descriptive-statement" is treated as an equation or constraint where "boolean attribute" denotes a predicate taking involved math entities and conditions(s) as its parameters. While the "is a" assertion declarative is somewhat related to a "type declaration" in conventional programming language, its semantics is significantly richer.

Figure 7A:
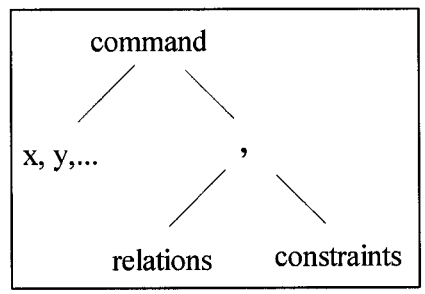
FIGS. 7A-7B illustrate exemplary hierarchical structures of command statements.
Figure 7B:
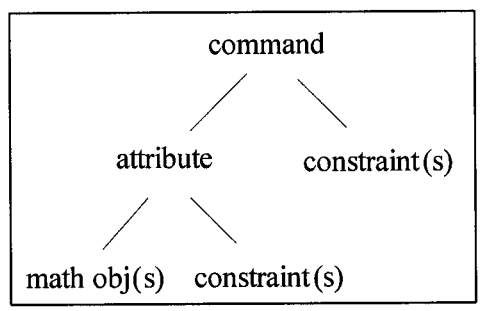

The Command declarative operates on, or deduces properties from, single or multiple entities. Two exemplary hierarchal structures of a Command declaratives are illustrated in FIGS. 7A and 7B

The Query statement imposes a question, or query, about certain attributes/characterizations of math entities. Examples include (with Queries noted in bold):

| | |
|---|---|
| f(x,y) = ln(x−a)*sin(2*pi*y); | //definition |
| Is f(x,y) continuous at x = a, 0<= y < pi? | //query |
| Is f(x,y) periodic? | //query |

The pedagogical value of "query" should be self-evident. It enables students to ask questions—the most important activity in human learning. During the execution of a query, the description phrase is forwarded to the entity involved. The entity checking its lexicon and finds the criteria of satisfying this description phrase. Subsequently, calculation is done against the criteria and the query is answered. Queries involving multiple-entities can is processed by one of the entities involved or a third being that can communicate with all entities involved.

Figure 8A:
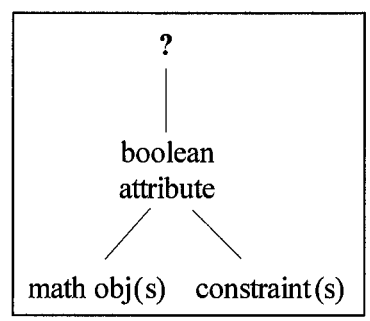
FIG. 8A illustrates an exemplary hierarchical structure of a query statement according to an embodiment.
Figure 8B:
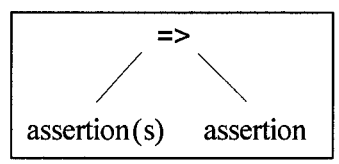
FIG. 8B illustrates an exemplary hierarchical structure of deduction statement according to an embodiment.

The Deduction declarative structure includes one or more initial constraints and assertions, along with one or more conclusions that are to be shown or proved. Exemplary hierarchal structure of a deduction statement is illustrated in FIG. 8B.

The hybrid syntactic structures described above, combined with the math-notation friendly syntax for mathematical expressions, are thus used together to provide a user with a relatively straightforward problem definition mechanism. A number of examples of user input, and of the user input, and generation of output are provided, in order to illustrate some exemplary uses of methods and systems provided herein. In one example, a number of one-dimensional statements, including assertion and command, are used to define the computation of the distance from a point to a plane:

| | |
|---|---|
| A = (x_0, y_0, z_0); | //assignment |
| S = {(x,y,z)\|z=x^2+y^2}; | //assignment |
| P is the tangent plane of S at x = 0, y = h; | //assertion |
| calculate the distance between P and A; | //command |

The unique characteristics of the above-mentioned hybrid statements include but not limited to 1) symbolic expressions can be embedded in the hybrid statements with symbols defined in earlier statement; and 2) symbolic statements such as equations and inequalities can be referred through their labels in the hybrid statements including but not limited to command statements.

Composition of step-by-step procedure and narrative explaining the concepts involved is done through implementing documenting routines before and after the method/subroutine associated with an operators within an AST that is deemed as non-trivial, i.e., (+, −, *, / and ^ as power operator) applied to primitive variables such as integer, real and rational numbers. In the pre-operator documenting routine, normally but not always, the natural of the operation to be performed by the operator is identified and pertinent discussion given. In the post-operator documenting routine, normally but not always, the results resulted from the application of the operator is presented.

Described now are interpretation results that involve solution of algebraic equations, symbolic differentiation and integration, vector calculus, tabular data input, small matrix manipulation, implicit differentiation, triple integral, line and surface integral, examples for query and commands in hybrid syntax. Case A solves of a set of linear equations. This case demonstrates the equation/relation reference mechanism command structure. Case A: Solution of set of linear equations begins with a user input comprising:

Input:
begin $$3x-4y+2z=0.3; \quad (1.1)$$

$$13x+2y-34z=1.5; \quad (1.2)$$

$$-5x-12y+0.1z=10.9; \quad (1.3)$$

Solve x,y,z from (1.1)-(1.3);
end#

The one-dimensional statements, and the command statement, are processed and, in this example, an interpreted input is displayed that may be used to verify the input was interpreted correctly.

Interpreted Input:

$$3x-4y+2z=0.3 \quad (1.1)$$

$$(13x+2y)-34z=1.5 \quad (1.2)$$

$$-5x-12y+0.1z=10.9 \quad (1.3)$$

Solve x, y, z from 1.1-1.3.

The one-dimensional statements are used to form ASTs, and the command statement used to determine functions to perform on objects in the ASTs. In this example, a final answer to the command statement is determined and output as follows.

Output:

$$\begin{cases} x = -0.5849054881 \\ y = -0.6671810794 \\ z = -0.3070039266 \end{cases}$$

As mentioned above, in some embodiments intermediate steps may be calculated and displayed to a user. In this example, a series of intermediate results are displayed to a user as follows.

Intermediate Steps:
To solve the linear system, we use the Gauss-Jordon elimination method. Let's first write the above set of linear equations in the following matrix form:

$$\begin{bmatrix} -5.0000 & -12.0000 & 0.1000 \\ 13.0000 & 2.0000 & -34.0000 \\ 3.0000 & -4.0000 & 2.0000 \end{bmatrix} \begin{bmatrix} x \\ y \\ z \end{bmatrix} = \begin{bmatrix} 10.9000 \\ 1.5000 \\ 0.3000 \end{bmatrix}$$

The Gauss-Jordon method applies a series of elementary row operations to both the coefficient matrix (A) and the column matrix on the right-hand-side (b) simultaneously until A becomes identity matrix (I). Then, the un-known column matrix is the same as b.

There are two types of elementary row operations involved here. One is row swapping represented by $r_i \leftrightarrow r_j$; the another is row addition, in which a row ($r_i$) is replaced by the summation or difference between itself and another row ($r_j$) multiplied by a constant (c). Row addition is represented by $r_i \leftarrow r_i \pm cr_j$.

Listed below are the sequence of the elementary row operations performed. Notice that the current pivot element is highlighted using boldface font for clarity.

$r_0 \leftrightarrow r_1$:

$$\begin{bmatrix} 13.0000 & 2.0000 & -34.0000 \\ -5.0000 & -12.0000 & 0.1000 \\ 3.0000 & -4.0000 & 2.0000 \end{bmatrix} \begin{bmatrix} y \\ x \\ z \end{bmatrix} = \begin{bmatrix} 1.5000 \\ 10.9000 \\ 0.3000 \end{bmatrix}$$

$r_1 \leftarrow r_1 - (a_{10}/a_{00})r_0$, $$\begin{bmatrix} 13.0000 & 2.0000 & -34.0000 \\ 0.0000 & -11.2308 & -12.9769 \\ 3.0000 & -4.0000 & 2.0000 \end{bmatrix} \begin{bmatrix} y \\ x \\ z \end{bmatrix} = \begin{bmatrix} 1.5000 \\ 11.4769 \\ 0.3000 \end{bmatrix}$$

$r_2 \leftarrow r_2 - (a_{20}/a_{00})r_0$, $$\begin{bmatrix} 13.0000 & 2.0000 & -34.0000 \\ 0.0000 & -11.2308 & -12.9769 \\ 0.0000 & -4.4615 & 9.8462 \end{bmatrix} \begin{bmatrix} y \\ x \\ z \end{bmatrix} = \begin{bmatrix} 1.5000 \\ 11.4769 \\ -0.0462 \end{bmatrix}$$

$r_0 \leftarrow r_0 - (a_{01}/a_{11})r_1$, $$\begin{bmatrix} 13.0000 & 0.0000 & -36.3110 \\ 0.0000 & -11.2308 & -12.9769 \\ 0.0000 & -4.4615 & 9.8462 \end{bmatrix} \begin{bmatrix} y \\ x \\ z \end{bmatrix} = \begin{bmatrix} 3.5438 \\ 11.4769 \\ -0.0462 \end{bmatrix}$$

$r_2 \leftarrow r_2 - (a_{21}/a_{11})r_1$, $$\begin{bmatrix} 13.0000 & 0.0000 & -36.3110 \\ 0.0000 & -11.2308 & -12.9769 \\ 0.0000 & 0.0000 & 15.0014 \end{bmatrix} \begin{bmatrix} y \\ x \\ z \end{bmatrix} = \begin{bmatrix} 3.5438 \\ 11.4769 \\ -4.6055 \end{bmatrix}$$

$r_0 \leftarrow r_0 - (a_{02}/a_{22})r_2$, $$\begin{bmatrix} 13.0000 & 0.0000 & 0.0000 \\ 0.0000 & -11.2308 & -12.9769 \\ 0.0000 & 0.0000 & 15.0014 \end{bmatrix} \begin{bmatrix} y \\ x \\ z \end{bmatrix} = \begin{bmatrix} -7.6038 \\ 11.4769 \\ -4.6055 \end{bmatrix}$$

$r_1 \leftarrow r_1 - (a_{12}/a_{22})r_2$, $$\begin{bmatrix} 13.0000 & 0.0000 & 0.0000 \\ 0.0000 & -11.2308 & 0.0000 \\ 0.0000 & 0.0000 & 15.0014 \end{bmatrix} \begin{bmatrix} y \\ x \\ z \end{bmatrix} = \begin{bmatrix} -7.6038 \\ 7.4930 \\ -4.6055 \end{bmatrix}$$

Dividing each row of the coefficient matrix A and the column matrix b by the diagonal element $a_{ii}$, the system becomes:

$$\begin{bmatrix} 1.0000 & 0.0000 & 0.0000 \\ 0.0000 & 1.0000 & 0.0000 \\ 0.0000 & 0.0000 & 1.0000 \end{bmatrix} \begin{bmatrix} y \\ x \\ z \end{bmatrix} = \begin{bmatrix} -0.5849 \\ -0.6672 \\ -0.3070 \end{bmatrix}$$

As can be seen, now the coefficient matrix A is an identity matrix and we have:

$$\begin{bmatrix} y \\ x \\ z \end{bmatrix} = \begin{bmatrix} -0.5849 \\ -0.6672 \\ -0.3070 \end{bmatrix}$$

The "Intermediate Steps" of this embodiment are created by a "solution composer." Providing such a display of partial results may provide pedagogical value to student, and other users. In some embodiments, a user may not desire to view this sometimes lengthy and/or verbose section of output, and the display of such intermediate results can be turned off by the user. It worthwhile to point out that the whole linear system instead of the augmented matrix is displayed in the step-by-step illustration of the solving process with the hope that doing so would be more intuitive for student users, for example, to understand the operations involved. While row swapping is important for many practical applications, it could be a distraction to users, and may be turned off in various embodiments.

From an input and interpretation point of view, the system considers a typical piece of scientific writing as a list of the following basic blocks:

<pre-formulae narrative><formula list><post-formulae narratives>

The <pre-formulae narrative> normally contains descriptions about procedures and assumptions leading to the formulae—mathematical/quantitative statements about name entities appeared in the text; and <post-formulae narrative> provides explanations about the symbols representing the name entities and further elaborations about the equations. This structure is used in the construction of "Intermediate Steps" in this example.

Continuing with the examples, Case B solves a single non-linear equation using numerical method. This is a simple example showing how symbolic (differentiation) and numerical algorithms (the Newton-Raphson) can work together to solve math problems. Although the below output examples are static, namely, it only displays a snapshot of the numerical data in the form of tables and graphics, various embodiments allow users to browse the data and interact with its visualizations (2D and 3D) dynamically in an output window. In many cases, users such as engineers and researchers may find that having all data in a problem easily accessible without having to memorize names/location and their contents are useful their daily work.

Case B: Solution of Non-Linear Equation[1]
Input:
begin $x^2 - \exp(x) = \sin(x) + 0.3;$ (1.1)

Solve x from (1.1) numerically;
end#
Interpreted Input:

$x^2 - e^x = \sin(x) + 0.3$ (1.1)

Solve x from 1.1.
Output:

$x = -0.5703899316$

Intermediate Steps:
Let's try solving the single non-linear equation $x^2 - e^x = \sin(x) + 0.3$ numerically with the Newton-Raphson method. First, let's transform the equation into a standardized form:

$f(x) = (x^2 - e^x) - (\sin(x) + 0.3) = 0$

The Newton-Raphson method finds a solution of the equation, i.e., a root of function $f(x)$ by approximate the function linearly in the vicinity of $x_k$ through $f(x) = f(x_k) + f'(x_k)(x - x_k), k \geq 0$ where $f'(x_k)$ is the derivative of $f$ with respect to x evaluated at $x = x_k$ $$f'(x_k) \equiv \frac{df(x_k)}{dx} \equiv \left(\frac{df(x)}{dx}\right)_{x = x_k}$$

The iterative equation can be obtained by setting $f(x)=0$ and solving for x from the approximating equation:

$$x_{k+1} = x_k - \frac{f(x_k)}{f'(x_k)}$$

The derivative $df(x)/dx$ can be calculated from the definition of $f(x)$, $$\frac{df(x)}{dx} = (2x - e^x) - \cos(x)$$

Substitutive the derivative to the iterative equation, we obtain:

$$x_{k+1} = x_k - \frac{f(x_k)}{(2x_k - e^{x_k}) - \cos(x_k)}$$

Starting with initial guess $x_0 = 1.0$, the iteration is terminated after 6 iterations when the pre-set convergence criterion $|x_{k+1} - x_k| \leq 1.\text{e-}006^2$ is met. The intermediate iteration results are listed in the table below.

| k | $x_k$ | $f(x_k)$ | $(df/dx)_{x=xk}$ | $|x_k - x_{k-1}|$ |
|---|---|---|---|---|
| 0 | 1.00000000 | −2.85975281 | −1.25858413 | N.A. |
| 1 | −1.27219837 | 1.99402363 | −3.11879216 | 2.2722e+000 |
| 2 | −0.63284071 | 0.16084411 | −2.60311309 | 6.3936e−001 |
| 3 | −0.57105158 | 0.00168592 | −2.54836726 | 6.1789e−002 |
| 4 | −0.57039001 | 0.00000020 | −2.54777539 | 6.6157e−004 |
| 5 | −0.57038993 | 0.00000000 | −2.54777532 | 7.6841e−008 |

Continuing with the examples, Case C illustrates syntax for integration and the working of a heuristic symbolic integrator, which can solve common integrals using method of substitution, both the first and the second types, and integration by part (limited depth). The step-by-step illustration of the problem solving process replicates a human-constructed solution. Consistent intermediate representations generated via a formal grammar enable the development of such functionality.

Case C: Symbolic Integration[1]

Input:
begin
function f, g, p, q;
f(x)=$(x^3*(i-x^2))dx;
g(x)=$(kappa*exp(-beta*x)+x/sqrt(a^2-x^2))dx;
p(x)=$(x*cos(x^2))dx;
q(x)=$(sin(x) ^3*cos(x) ^2)dx;
end#
Interpreted Input:

$$f(x)=\int x^3(1-x^2)dx$$

$$g(x) = \int \left(\kappa e^{-\beta x} + \frac{x}{\sqrt{a^2-x^2}}\right)dx$$

$$p(x)=\int x\cos(x^2)dx$$

$$q(x)=\int \sin^3(x)\cos^2(x)dx$$

Output:

$$f(x) = \frac{1}{4}x^4 - \frac{1}{6}x^6$$

$$g(x) = \kappa\frac{1}{-\beta}e^{-\beta x} - a\cos\left(\arcsin\left(\frac{x}{a}\right)\right)$$

$$p(x) = \frac{1}{2}\sin(x^2)$$

$$q(x) = -\left(\frac{1}{3}\cos^3(x) - \frac{1}{5}\cos^5(x)\right)$$

Intermediate Steps:
§Notice the integrand of integral $\int x^3(1-x^2)dx$ contains product that can be further expanded, so let's try expanding the integrand and then integrating term-by-term:

$$x^3(1-x^2)=x^3-x^5$$

Applying the additive rule of integration, we have $$\int(x^3-x^5)dx=\int x^3 dx - \int x^5 dx$$

$$\int x^3 dx = \frac{1}{3+1}x^{3+1} = \frac{1}{4}x^4$$

$$\int x^5 dx = \frac{1}{5+1}x^{5+1} = \frac{1}{6}x^6$$

Summing-up all integrals, we obtain:

$$\int(x^3-x^5)dx = \frac{1}{4}x^4 - \frac{1}{6}x^6$$

§Applying the additive rule of integration, we have $$\int\left(\kappa e^{-\beta x} + \frac{x}{\sqrt{a^2-x^2}}\right)dx = \int \kappa e^{-\beta x}dx + \int \frac{x}{\sqrt{a^2-x^2}}dx$$

Factoring out x-independent factor $$\int \kappa e^{-\beta x}dx = \kappa\int e^{-\beta x}dx$$

To evaluate indefinite integral $\int e^{-\beta x}dx$, let's try substitution $$u=-\beta x$$

$$\frac{d}{dx}(-\beta x) = -\frac{d}{dx}(\beta x)$$

Applying product rule $$\frac{d}{dx}(uv) = v\frac{du}{dx} + u\frac{dv}{dx}:$$

$$\frac{d}{dx}(\beta x) = \frac{d}{dx}(\beta)\cdot x + \frac{d}{dx}(x)\cdot \beta$$

$$= 0\cdot x + \beta\cdot\frac{d}{dx}(x)$$

$$= 0 + \beta\cdot\frac{d}{dx}(x)$$

$$= 0 + \beta\cdot 1$$

$$= \beta$$

Therefore $$\frac{d}{dx}(-\beta x) = -\beta$$

Thus $$\frac{du}{dx} = -\beta$$

and $$\int e^{-\beta x}dx = \int \frac{e^u}{-\beta}du$$

Factoring out u-independent factor $$\int \frac{e^u}{-\beta}du = \frac{1}{-\beta}\int e^u du$$

$$= \frac{1}{-\beta}e^u$$

Substituting u=−βx back to the result above gives $$\int e^{-\beta x}dx = \frac{1}{-\beta}e^{-\beta x}$$

Therefore $$\int \kappa e^{-\beta x}dx = \kappa\frac{1}{-\beta}e^{-\beta x}$$

Notice that the integrand of integral $$\int \frac{x}{\sqrt{a^2 - x^2}} dx$$

contains pattern $\sqrt{a^2-x^2}$.

A common approach for solving this type of integral is to using trigonometric substitution:

$$x = a\sin(\phi), \quad -\pi/2 \le \phi \le +\pi/2$$

We have chosen the value of $\phi=\arcsin(x/a)$ to be within its principal values between $-\pi/2$ and $\pi/2$. As a result, we have $\cos(\phi) \ge 0$ and thus $$\sqrt{a^2-x^2} = |a|\cos(\phi)$$

Applying product rule $$\frac{d}{dx}(uv) = v\frac{du}{dx} + u\frac{dv}{dx}:$$

$$\begin{aligned}\frac{d}{d\varphi}(a\sin(\varphi)) &= \frac{d}{d\varphi}(a)\cdot\sin(\varphi) + \frac{d}{d\varphi}(\sin(\varphi))\cdot a \\ &= 0\cdot\sin(\varphi) + a\cdot\frac{d}{d\varphi}(\sin(\varphi)) \\ &= 0 + a\cdot\frac{d}{d\varphi}(\sin(\varphi)) \\ &= 0 + a\cdot\cos(\varphi) \\ &= a\cos(\varphi)\end{aligned}$$

Thus $$\frac{dx}{d\varphi} = a\cos(\varphi)$$

and $$\int \frac{x}{\sqrt{a^2 - x^2}} dx = \int \sin(\varphi) a\, d\varphi$$

Factoring out $\phi$-independent factor $$\begin{aligned}\int \sin(\varphi) a\, d\varphi &= a\int \sin(\varphi) d\varphi \\ &= -a\cos(\varphi)\end{aligned}$$

Substituting $$\varphi = \arcsin\left(\frac{x}{a}\right)$$

back to the above result gives $$\int \frac{x}{\sqrt{a^2 - x^2}} dx = -a\cos\left(\arcsin\left(\frac{x}{a}\right)\right)$$

Summing-up all integrals, we obtain:

$$\int \left(\kappa e^{-\beta x} + \frac{x}{\sqrt{a^2 - x^2}}\right)dx = \kappa \frac{1}{-\beta}e^{-\beta x} - a\cos\left(\arcsin\left(\frac{x}{a}\right)\right)$$

§To evaluate indefinite integral $\int x\cos(x^2)dx$, let's try substitution $$u = x^2$$

$$\frac{d}{dx}(x^2) = 2x$$

Thus $$\frac{du}{dx} = 2x$$

and $$\int x\cos(x^2)dx = \int \frac{\cos(u)}{2} du$$

Factoring out u-independent factor $$\begin{aligned}\int \frac{\cos(u)}{2} du &= \frac{1}{2}\int \cos(u) du \\ &= \frac{1}{2}\sin(u)\end{aligned}$$

Substituting $u=x^2$ back to the result above gives $$\int x\cos(x^2)dx = \frac{1}{2}\sin(x^2)$$

§Notice that the integrand of integral $\int \sin(x)^3 \cos(x)^2 dx$ contains pattern $\sin(x)^m$. Applying trigonometric identity $$\sin(x)^2 = 1 - \cos(x)^2$$

to the integrand gives:

$$\begin{aligned}\sin(x)^3\cos(x)^2 &= (1-\cos(x)^2)\cos(x)^2\sin(x) \\ &= (\cos(x)^2 - \cos(x)^4)\sin(x)\end{aligned}$$

To evaluate indefinite integral $\int(\cos(x)^2 - \cos(x)^4)\sin(x)dx$, let's try substitution $$u = \cos(x)$$

Thus $$\frac{du}{dx} = -\sin(x)$$

and $$\int (\cos(x)^2 - \cos(x)^4)\sin(x)dx = \int -(u^2 - u^4)du = -\int (u^2 - u^4)du$$

Applying the additive rule of integration, we have $$\int (u^2-u^4)du = \int u^2 du - \int u^4 du$$

$$\int u^2 du = \frac{1}{2+1}u^{2+1} = \frac{1}{3}u^3$$

$$\int u^4 du = \frac{1}{4+1}u^{4+1} = \frac{1}{5}u^5$$

Summing-up all integrals, we obtain:

$$\int (u^2 - u^4)du = \frac{1}{3}u^3 - \frac{1}{5}u^5$$

Substituting u=cos(x) back to the result above gives $$\int (\cos(x)^2 - \cos(x)^4)\sin(x)dx = -\left(\frac{1}{3}\cos(x)^3 - \frac{1}{5}\cos(x)^5\right)$$

Continuing with examples, Case D illustrates the relative compactness of vector syntax of an embodiment, and its similarity to the corresponding natural math notation. Vector is among some of the most important mathematical concepts that find wide applications in engineering and physics. Many users note that vector calculus can be an initial obstacle to students in learning mechanics and electrostatics. Software with easy syntax for defining vectors and their operations along with adequate illustration of the right-hand rule can be very helpful to students.

Case D: Vector Calculus[1]
Input:
begin
A=a*i^^+b*j^^+c*k^^;
B=x*y^2*i^^+ln(y+z)*j^^+(kappa/x)*k^^;
r=x*i^^+y*j^^+z*k^^;
T_s=A.B*r;
C=(alpha*i^^+beta*j^^)*A^^;
D=grad*B;
E=|B|*grad.B;
end#
Interpreted Input:

$$A = a\hat{i} + b\hat{j} + c\hat{k}$$

$$B = xy^2\hat{i} + \ln(y+z)\hat{j} + \frac{\kappa}{x}\hat{k}$$

$$r = x\hat{i} + y\hat{j} + z\hat{k}$$

$$T_s = A \cdot B \times r$$

$$C = (\alpha\hat{i} + \beta\hat{j}) \times \hat{A}$$

$$D = \nabla \times B$$

$$E = |B|\nabla \cdot B$$

Output:

$$A = a\hat{i} + b\hat{j} + c\hat{k}$$

$$B = xy^2\hat{i} + \ln(y+z)\hat{j} + \frac{\kappa}{x}\hat{k}$$

$$r = x\hat{i} + y\hat{j} + z\hat{k}$$

$$T_s = a\left(\ln(y+z)z - \frac{\kappa}{x}y\right) + b(\kappa - xy^2 z) + c(xy^3 - \ln(y+z)x)$$

$$C = \beta\frac{c}{\sqrt{a^2+b^2+c^2}}\hat{i} - \alpha\frac{c}{\sqrt{a^2+b^2+c^2}}\hat{j} + \left(\alpha\frac{b}{\sqrt{2^2+b^2+c^2}} - \beta\frac{a}{\sqrt{a^2+b^2+c^2}}\right)\hat{k}$$

$$D = -\frac{1}{y+z}\hat{i} + \frac{\kappa}{x^2}\hat{j} - x2y\hat{k}$$

$$E = \sqrt{x^2 y^4 + \ln^2(y+z) + \left(\frac{\kappa}{x}\right)^2}\left(y^2 + \frac{1}{y+z}\right)$$

Intermediate Steps:

B×r can be calculated from the definition of cross product (or vector product) of two vectors, $$B \times r = \begin{vmatrix} \hat{i} & \hat{j} & \hat{k} \\ xy^2 & \ln(y+z) & \frac{\kappa}{x} \\ x & y & z \end{vmatrix}$$

$$= \left(\ln(y+z)z - \frac{\kappa}{x}y\right)\hat{i} + (\kappa - xy^2 z)\hat{j} + (xy^3 - \ln(y+z)x)\hat{k}$$

Dot product (or scalar product) of two vectors can be calculated by multiplying like-components and then add, $$A \cdot (B \times r) = (A_x\hat{i} + A_y\hat{j} + A_z\hat{k}) \cdot ((B \times r)_x\hat{i} + (B \times r)_y\hat{j} + (B \times r)_z\hat{k})$$

$$= A_x(B \times r)_x + A_y(B \times r)_y + A_z(B \times r)_z$$

$$= (a)\left(\ln(y+z)z - \frac{\kappa}{x}y\right) + (b)(\kappa - xy^2 z) + (c)(xy^3 - \ln(y+z)x)$$

$$= a\left(\ln(y+z)z - \frac{\kappa}{x}y\right) + b(\kappa - xy^2 z) + c(xy^3 - \ln(y+z)x)$$

Unit vector $\hat{A}$ is defined by $$\hat{A} = \frac{A_x}{|A|}\hat{i} + \frac{A_y}{|A|}\hat{j} + \frac{A_z}{|A|}\hat{k}$$

where $A_x, A_y, A_z$ are the components of the vector, and $|A|$ is the length of the vector:

$$|A| = \sqrt{a^2 + b^2 + c^2}$$

thus $$\hat{A} = \frac{a}{\sqrt{a^2+b^2+c^2}}\hat{i} + \frac{b}{\sqrt{a^2+b^2+c^2}}\hat{j} + \frac{c}{\sqrt{a^2+b^2+c^2}}\hat{k}$$

$(\alpha\hat{i}+\beta\hat{j})\times\hat{A}$ can be calculated from the definition of cross product (or vector product) of two vectors, $$(\alpha\hat{i}+\beta\hat{j})\times\hat{A} = \begin{vmatrix} \hat{i} & \hat{j} & \hat{k} \\ \alpha & \beta & 0 \\ \frac{a}{\sqrt{a^2+b^2+c^2}} & \frac{b}{\sqrt{a^2+b^2+c^2}} & \frac{c}{\sqrt{a^2+b^2+c^2}} \end{vmatrix}$$

$$= \beta\frac{c}{\sqrt{a^2+b^2+c^2}}\hat{i} +$$

$$\left(-\alpha\frac{c}{\sqrt{a^2+b^2+c^2}}\right)\hat{j} +$$

$$\left(\alpha\frac{b}{\sqrt{a^2+b^2+c^2}} - \beta\frac{a}{\sqrt{a^2+b^2+c^2}}\right)\hat{k}$$

The curl of vector field B can be calculated from $$\nabla\times B = \begin{vmatrix} \hat{i} & \hat{j} & \hat{k} \\ \frac{\partial}{\partial x} & \frac{\partial}{\partial y} & \frac{\partial}{\partial z} \\ B_x & B_y & B_z \end{vmatrix}$$

$$= \begin{vmatrix} \hat{i} & \hat{j} & \hat{k} \\ \frac{\partial}{\partial x} & \frac{\partial}{\partial y} & \frac{\partial}{\partial z} \\ xy^2 & \ln(y+z) & \frac{\kappa}{x} \end{vmatrix}$$

Applying chain rule for composite functions $$\frac{d}{dx}f(u(x)) = \frac{df(u)}{du}\frac{du(x)}{dx}:$$

$$\frac{d}{dz}(\ln(y+z)) = \frac{d(\ln(y+z))}{d(y+z)}\cdot\frac{d}{dz}(y+z)$$

$$= \frac{1}{y+z}\cdot\frac{d}{dz}(y+z)$$

Applying additive rule $$\frac{d}{dx}(u+v) = \frac{du}{dx} + \frac{du}{dx}:$$

$$\frac{d}{dz}(y+z) = \frac{d}{dz}(y) + \frac{d}{dz}(z)$$

$$= 0 + \frac{d}{dz}(z)$$

$$= 0 + 1$$

$$= 1$$

Therefore $$\frac{d}{dz}(\ln(y+z)) = \frac{1}{y+z}$$

Applying quotient rule $$\frac{d}{dx}\left(\frac{u}{v}\right) = \left(u\frac{dv}{dx} - v\frac{du}{dx}\right)/v^2:$$

$$\frac{d}{dy}\left(\frac{\kappa}{x}\right) = \frac{x\cdot\frac{d}{dy}(\kappa) - \kappa\cdot\frac{d}{dy}(x)}{(x)^2}$$

$$= \frac{0}{x} - \frac{\kappa\cdot\frac{d}{dy}(x)}{(x)^2}$$

$$= \frac{0}{x} - \frac{\kappa\cdot 0}{(x)^2}$$

$$= 0$$

Applying quotient rule $$\frac{d}{dx}\left(\frac{u}{v}\right) = \left(u\frac{dv}{dx} - v\frac{du}{dx}\right)/v^2:$$

$$\frac{d}{dx}\left(\frac{\kappa}{x}\right) = \frac{x\cdot\frac{d}{dx}(\kappa) - \kappa\cdot\frac{d}{dx}(x)}{(x)^2}$$

$$= \frac{0}{x} - \frac{\kappa\cdot\frac{d}{dx}(x)}{(x)^2}$$

$$= \frac{0}{x} - \frac{\kappa\cdot 1}{(x)^2}$$

$$= -\frac{\kappa}{x^2}$$

Applying product rule $$\frac{d}{dx}(uv) = v\frac{du}{dx} + u\frac{dv}{dx}:$$

$$\frac{d}{dz}(xy^2) = \frac{d}{dz}(x)\cdot y^2 + \frac{d}{dz}(y^2)\cdot x$$

$$= 0\cdot y^2 + x\cdot\frac{d}{dz}(y^2)$$

$$= 0 + x\cdot\frac{d}{dz}(y^2)$$

$$= 0 + x\cdot 0$$

$$= 0$$

Applying product rule $$\frac{d}{dx}(uv) = v\frac{du}{dx} + u\frac{dv}{dx}:$$

-continued $$\frac{d}{dy}(xy^2) = \frac{d}{dy}(x) \cdot y^2 + \frac{d}{dy}(y^2) \cdot x$$
$$= 0 \cdot y^2 + x \cdot \frac{d}{dy}(y^2)$$
$$= 0 + x \cdot \frac{d}{dy}(y^2)$$
$$= 0 + x \cdot 2y$$
$$= x2y$$

Applying chain rule for composite functions $$\frac{d}{dx}f(u(x)) = \frac{df(u)}{du}\frac{du(x)}{dx}:$$
$$\frac{d}{dx}(\ln(y+z)) = \frac{d(\ln(y+z))}{d(y+z)} \cdot \frac{d}{dx}(y+z)$$
$$= \frac{1}{y+z} \cdot \frac{d}{dx}(y+z)$$

Applying additive rule $$\frac{d}{dx}(u+v) = \frac{du}{dx} + \frac{dv}{dx}:$$
$$\frac{d}{dx}(y+z) = \frac{d}{dx}(y) + \frac{d}{dx}(z)$$
$$= 0 + \frac{d}{dx}(z)$$
$$= 0 + 0$$
$$= 0$$

Therefore $$\frac{d}{dx}(\ln(y+z)) = 0$$

Thus, $$\nabla \times B = \left(-\frac{1}{y+z}\right)\hat{i} + \frac{\kappa}{x^2}\hat{j} + (-x2y)\hat{k}$$

The divergence of vector-field B can be calculated from $$\nabla \cdot B = \left(\hat{i}\frac{\partial}{\partial x} + \hat{j}\frac{\partial}{\partial y} + \hat{k}\frac{\partial}{\partial z}\right) \cdot (B_x\hat{i} + B_y\hat{j} + B_z\hat{k})$$
$$= \frac{\partial B_x}{\partial x} + \frac{\partial B_y}{\partial y} + \frac{\partial B_z}{\partial z}$$
$$= \frac{\partial}{\partial x}(xy^2) + \frac{\partial}{\partial y}(\ln(y+z)) + \frac{\partial}{\partial z}\left(\frac{\kappa}{x}\right)$$

Applying product rule $$\frac{d}{dx}(uv) = v\frac{du}{dx} + u\frac{dv}{dx}:$$

-continued $$\frac{d}{dx}(xy^2) = \frac{d}{dx}(x) \cdot y^2 + \frac{d}{dx}(y^2) \cdot x$$
$$= 1 \cdot y^2 + x \cdot \frac{d}{dx}(y^2)$$
$$= y^2 + x \cdot \frac{d}{dx}(y^2)$$
$$= y^2 + x \cdot 0$$
$$= y^2$$

Applying chain rule for composite functions $$\frac{d}{dx}f(u(x)) = \frac{df(u)}{du}\frac{du(x)}{dx}:$$
$$\frac{d}{dy}(\ln(y+z)) = \frac{d(\ln(y+z))}{d(y+z)} \cdot \frac{d}{dy}(y+z)$$
$$= \frac{1}{y+z} \cdot \frac{d}{dy}(y+z)$$

Applying additive rule $$\frac{d}{dx}(u+v) = \frac{du}{dx} + \frac{dv}{dx}:$$
$$\frac{d}{dy}(y+z) = \frac{d}{dy}(y) + \frac{d}{dy}(z)$$
$$= 1 + \frac{d}{dy}(z)$$
$$= 1 + 0$$
$$= 1$$

Therefore $$\frac{d}{dy}(\ln(y+z)) = \frac{1}{y+z}$$

Applying quotient rule $$\frac{d}{dx}\left(\frac{u}{v}\right) = \left(u\frac{dv}{dx} - v\frac{du}{dx}\right)/v^2:$$
$$\frac{d}{dz}\left(\frac{\kappa}{x}\right) = \frac{x \cdot \frac{d}{dz}(\kappa) - \kappa \cdot \frac{d}{dz}(x)}{(x)^2}$$
$$= \frac{0}{x} - \frac{\kappa \cdot \frac{d}{dz}(x)}{(x)^2}$$
$$= \frac{0}{x} - \frac{\kappa \cdot 0}{(x)^2}$$
$$= 0$$

Thus $$\nabla \cdot B = y^2 + \frac{1}{y+z}$$

|B| is the length of vector B. By definition, $$|B| = \sqrt{B_x^2 + B_y^2 + B_z^2}$$

$$= \sqrt{x^2 y^4 + \ln(y+z)^2 + \left(\frac{\kappa}{x}\right)^2}$$

Continuing with examples, Case E illustrates Symbolic matrix definition and manipulations.

Case E: Symbolic Matrix Definition and Manipulations
Input:
begin
A=(a 2 psi)
(0 c h^2)
(x y z);
//Below is a 3×3 identity matrix
I=(1, 0, 0)
(0, 1, 0)
(0, 0, 1);
B=|A^T-kappa*I|;
end#
Interpreted Input:

$$A = \begin{pmatrix} a & 2 & \psi \\ 0 & c & h^2 \\ x & y & z \end{pmatrix}$$

$$I = \begin{pmatrix} 1 & 0 & 0 \\ 0 & 1 & 0 \\ 0 & 0 & 1 \end{pmatrix}$$

$$B = |A^T - \kappa I|$$

Output:

$$A = \begin{pmatrix} a & 2 & \psi \\ 0 & c & h^2 \\ x & y & z \end{pmatrix}$$

$$I = \begin{pmatrix} 1 & 0 & 0 \\ 0 & 1 & 0 \\ 0 & 0 & 1 \end{pmatrix}$$

$$B = (a-\kappa)((c-\kappa)(z-\kappa) - yh^2) + x(2h^2 - (c-\kappa)\psi)$$

Intermediate Steps:

Multiplying a matrix by a scalar results in a matrix with each element multiplied by the scalar. i.e, $$\kappa I \equiv \kappa \begin{pmatrix} 1 & 0 & 0 \\ 0 & 1 & 0 \\ 0 & 0 & 1 \end{pmatrix} = \begin{pmatrix} \kappa & 0 & 0 \\ 0 & \kappa & 0 \\ 0 & 0 & \kappa \end{pmatrix}$$

The transpose of a matrix is obtained by simply swapping elements $a_{ij}$ and $a_{ji}$, $$A^T = \begin{pmatrix} a & 2 & \psi \\ 0 & c & h^2 \\ x & y & z \end{pmatrix}^T = \begin{pmatrix} a & 0 & x \\ 2 & c & y \\ \psi & h^2 & z \end{pmatrix}$$

Subtracting a matrix by another matrix of the same dimensions results in a matrix with each element being the difference of the corresponding elements of the two matrices, i.e, $$A^T - \kappa I \equiv \begin{pmatrix} a & 0 & x \\ 2 & c & y \\ \psi & h^2 & z \end{pmatrix} - \begin{pmatrix} \kappa & 0 & 0 \\ 0 & \kappa & 0 \\ 0 & 0 & \kappa \end{pmatrix} = \begin{pmatrix} a-\kappa & 0 & x \\ 2 & c-\kappa & y \\ \psi & h^2 & z-\kappa \end{pmatrix}$$

Since the size of the matrix is quite small, we can use Laplace's formula to calculate $|A^T - \kappa I|$. According to the formula, the determinant is the summation of product of each element of a selected row (column) with its corresponding cofactor. Of course, we'd choose the row or column having the most zeros unless the matrix does not have any zero entry. In that case, we simply choose the first row for expansion. Thus, $$\begin{pmatrix} a-\kappa & 0 & x \\ 2 & c-\kappa & y \\ \psi & h^2 & z-\kappa \end{pmatrix} = a-\kappa \begin{vmatrix} c-\kappa & y \\ h^2 & z-\kappa \end{vmatrix} - 0 \begin{vmatrix} 2 & y \\ \psi & z-\kappa \end{vmatrix} + x \begin{vmatrix} 2 & c-\kappa \\ \psi & h^2 \end{vmatrix} =$$

$$(a-\kappa)((c-\kappa)(z-\kappa) - yh^2) + x(2h^2 - (c-\kappa)\psi)$$

Continuing with examples, Case F illustrates definition and manipulation of tabular data.

Case F: Definition and Manipulation of Tabular Data[1]
Input:
begin
function f;

| T = | | | |
|---|---|---|---|
| k | x; | y | sigma |
| 1 | 0.00 | 3.391130 | 0.169556 |
| 2 | 0.20 | 3.485675 | 0.174284 |
| 3 | 0.40 | 4.224254 | 0.211213 |
| 4 | 0.60 | 4.307524 | 0.215376 |
| 5 | 0.80 | 4.261938 | 0.213097 |
| 6 | 1.00 | 4.588840 | 0.229442 |
| 7 | 1.20 | 4.849868 | 0.242493 |
| 8 | 1.40 | 4.868594 | 0.243430 |
| 9 | 1.60 | 4.768181 | 0.238409 |
| 10 | 1.80 | 4.803114 | 0.240156 |
| 11 | 2.00 | 4.931015 | 0.246551 |
| 12 | 2.20 | 4.810400 | 0.240520 |
| 13 | 2.40 | 5.082588 | 0.254129 |
| 14 | 2.60 | 5.037386 | 0.251869 |
| 15 | 2.80 | 4.476670 | 0.223833 |
| 16 | 3.00 | 4.379418 | 0.218971 |
| 17 | 3.20 | 4.665796 | 0.233290 |
| 18 | 3.4 | 4.201536 | 0.210077 |
| 19 | 3.60 | 3.705798 | 0.185290 |
| 20 | 3.80 | 3.238404 | 0.161920; | kappa=sqrt(<y^2>-<y>^2);
f(x)=a*exp(-((x-mu)/b)^2);
Fit y,sigma to f;
end#
Interpreted Input:

Read the tabular data listed below and assign it to T:

TABLE 1

Input tabular data.

| k | x | y | σ |
|---|---|---|---|
| 1 | 0.0 | 3.39113 | 0.169556 |
| 2 | 0.2 | 3.485675 | 0.174284 |
| 3 | 0.4 | 4.224254 | 0.211213 |
| 4 | 0.6 | 4.307524 | 0.215376 |
| 5 | 0.8 | 4.261938 | 0.213097 |
| 6 | 1.0 | 4.58884 | 0.229442 |
| 7 | 1.2 | 4.849868 | 0.242493 |
| 8 | 1.4 | 4.868594 | 0.24343 |
| 9 | 1.6 | 4.768181 | 0.238409 |
| 10 | 1.8 | 4.803114 | 0.240156 |
| 11 | 2.0 | 4.931015 | 0.246551 |
| 12 | 2.2 | 4.8104 | 0.24052 |
| 13 | 2.4 | 5.082588 | 0.254129 |
| 14 | 2.6 | 5.037386 | 0.251869 |
| 15 | 2.8 | 4.47667 | 0.223833 |
| 16 | 3.0 | 4.379418 | 0.218971 |
| 17 | 3.2 | 4.665796 | 0.23329 |
| 18 | 3.4 | 4.201536 | 0.210077 |
| 19 | 3.6 | 3.705798 | 0.18529 |
| 20 | 3.8 | 3.238404 | 0.16192 |

$$\kappa = \sqrt{\langle y^2 \rangle - \langle y \rangle^2}$$

$$f(x) = ae^{-\left(\frac{x-\mu}{b}\right)^2}$$

Minimize:

$$x^2 = \sum_i \left(\frac{y_i - f_i}{\sigma_i}\right)^2.$$

Output:

κ = 0.5448777363

$$f(x) = 5.01438427 e^{-\left(\frac{x - 1.927226901}{3.072918892}\right)^2}$$

Using Levenberg-Marqurdt method with initial guessing:

$$\begin{cases} a_0 = 0.50 \\ \mu_0 = 0.50 \\ b_0 = 0.50 \end{cases}$$

the model parameters are estimated to be:

$$\begin{cases} a = 5.01438427 \\ \mu = 1.927226901 \\ b = 3.072918892 \end{cases}$$

and $$\chi^2 = 14.594367981$$

The table below lists both the input data and the corresponding model predication using the fitted parameter(s):

TABLE 2

Comparsion of input data and fit.

| k | x | y | σ | f(x) |
|---|---|---|---|---|
| 1.000000 | 0.000000 | 3.391130 | 0.169556 | 3.383717 |
| 2.000000 | 0.200000 | 3.485675 | 0.174284 | 3.656025 |
| 3.000000 | 0.400000 | 4.224254 | 0.211213 | 3.916922 |
| 4.000000 | 0.600000 | 4.307524 | 0.215376 | 4.161035 |
| 5.000000 | 0.800000 | 4.261938 | 0.213097 | 4.383070 |
| 6.000000 | 1.000000 | 4.588840 | 0.229442 | 4.578002 |
| 7.000000 | 1.200000 | 4.849868 | 0.242493 | 4.741266 |
| 8.000000 | 1.400000 | 4.868594 | 0.243430 | 4.868927 |
| 9.000000 | 1.600000 | 4.768181 | 0.238409 | 4.957845 |
| 10.000000 | 1.800000 | 4.803114 | 0.240156 | 5.005796 |
| 11.000000 | 2.000000 | 4.931015 | 0.246551 | 5.011573 |
| 12.000000 | 2.200000 | 4.810400 | 0.240520 | 4.975029 |
| 13.000000 | 2.400000 | 5.082588 | 0.254129 | 4.897086 |
| 14.000000 | 2.600000 | 5.037386 | 0.251869 | 4.779699 |
| 15.000000 | 2.800000 | 4.476670 | 0.223833 | 4.625770 |
| 16.000000 | 3.000000 | 4.379418 | 0.218971 | 4.439030 |
| 17.000000 | 3.200000 | 4.665796 | 0.233290 | 4.223892 |
| 18.000000 | 3.400000 | 4.201536 | 0.210077 | 3.985274 |
| 19.000000 | 3.600000 | 3.705798 | 0.185290 | 3.728415 |
| 20.000000 | 3.800000 | 3.238404 | 0.161920 | 3.458684 |

Intermediate Steps:

<y> is the average of column y in Table T, $$\langle y \rangle = \frac{1}{N} \sum_{i=1}^{N=20} y_i = 4.40390645$$

<y²> is the average of y², $$\langle y^2 \rangle = \frac{1}{N} \sum_{i=1}^{N=20} y_i^2$$

$$= 19.6912837678$$

Since both the observable and its standard error are provided in the input, the merit function can be written as:

$$\chi^2(a, \mu, b) = \sum_{i=1}^{20} \left(\frac{y_i - f(x_i)}{\sigma_i}\right)^2$$

where $$f(x) = ae^{-\left(\frac{x-\mu}{b}\right)^2}$$

We use the Leveberg-Marquadrt method to estimate the model parameter(s). The Leveberg-Marquadrt method uses the gradient, i.e., the first order derivatives, of the merit function w.r.t. the model parameter(s), as its guidance in searching minimum. To compute the gradient, we need the derivatives of the model w.r.t. the parameters to be fitted, which are given below:

$$\frac{\partial f(x)}{\partial a} = e^{-\left(\frac{x-\mu}{b}\right)^2}$$

-continued $$\frac{\partial f(x)}{\partial \mu} = ae^{-(\frac{x-\mu}{b})^2}\frac{2(x-\mu)}{b^2}$$

$$\frac{\partial f(x)}{\partial b} = ae^{-(\frac{x-\mu}{b})^2}\frac{2(x-\mu)^2}{b^3}$$

The algorithm is terminated after 10 iterations, when the pre-set convergence criterion $|\chi_{\kappa+1}^2 - \chi_{\kappa}^2| < 1.e-003^2$ is met. The iteration results are listed in the table below.

TABLE 3

Iteration results.

| step | a | μ | b | $\chi^2(a, \mu, b)$ |
|---|---|---|---|---|
| 0 | 0.500000 | 0.500000 | 0.500000 | 7601.939941 |
| 1 | 3.382416 | 1.533874 | 4.992346 | 611.439758 |
| 2 | 4.937086 | 2.878956 | −0.464357 | 5814.545898 |
| 3 | 4.932500 | 2.872879 | −0.422426 | 6020.951660 |
| 4 | 4.888673 | 2.815298 | −0.024240 | 7628.460938 |
| 5 | 4.585768 | 2.447740 | 2.565272 | 406.553802 |
| 6 | 4.838821 | 2.026784 | 3.151937 | 25.881390 |
| 7 | 5.010530 | 1.919288 | 3.067020 | 14.638807 |
| 8 | 5.014384 | 1.927227 | 3.072919 | 14.594368 |
| 9 | 5.014555 | 1.927224 | 3.072608 | 14.594371 |

Continuing with examples, Case G illustrates a triple integral.

Case G: Triple Integral[1]
Input:
begin
A=\$\$\$(x+y+1)dxdydz@(0<x<1, 0<y<x, 0<z<2);
end#
Interpreted Input:

$A = \int_0^1 \int_0^2 \int_0^x (x+y+1) dy dz dx$

Output:

A=2

Intermediate Steps:
The triple integral can be written as:

$\int_{x=0}^1 \int_{z=0}^2 \int_{y=0}^x (x+y+1) dy dz dx = \int_{x=0}^1 (\int_{z=0}^2 \int_{y=0}^x (x+y+1) dy dz) dx$ The double integral can be written as:

$\int_{z=0}^2 \int_{y=0}^x (x+y+1) dy dz = \int_{z=0}^2 (\int_{y=0}^x (x+y+1) dy) dz$ §To evaulate the definite integral $\int_0^x (x+y+1)dy$, let's first work out the indefinite integral $\int (x+y+1)dy$. Applying the additive rule of integration, we have $\int_{x=0}^1 (x+y+1)dy = \int xdy + \int ydy + \int 1dy$ $\int xdy = yx$ $\int ydy = \frac{1}{2}y^2$ $\int 1dy = y$ Summing-up all integrals, we obtain:

$$\int (x+y+1)dy = yx + \frac{1}{2}y^2 + y$$

Applying the fundamental theorem of calculus, $$\int_0^x (x+y+1)dy = \left(yx + \frac{1}{2}y^2 + y\right)\Big|_{y=0}^x$$

$$= \left(\frac{3}{2}x^2 + x\right) - (0)$$

$$= \frac{3}{2}x^2 + x$$

§To evaluate the definite integral $$\int_0^2 \left(\frac{3}{2}x^2 + x\right)dz,$$

let's first work out the indefinite integral $$\int \left(\frac{3}{2}x^2 + x\right)dz.$$

$$\int \left(\frac{3}{2}x^2 + x\right)dz = z\left(\frac{3}{2}x^2 + x\right)$$

Applying the fundamental theorem of calculus, $$\int_0^2 \left(\frac{3}{2}x^2 + x\right)dz = z\left(\frac{3}{2}x^2 + x\right)\Big|_{z=0}^2$$

$$= 2\left(\frac{3}{2}x^2 + x\right) - (0)$$

$$= 2\left(\frac{3}{2}x^2 + x\right)$$

Therefore, $$\int_0^2 \int_0^x (x+y+1)dy\, dz = 2\left(\frac{3}{2}x^2 + x\right)$$

§To evaluate the definite integral $$\int_0^1 2\left(\frac{3}{2}x^2 + x\right)dx,$$

let's first work out the indefinite integral $$\int 2\left(\frac{3}{2}x^2 + x\right)dx.$$

Factoring out x-independent factor $$\int 2\left(\frac{3}{2}x^2 + x\right)dx = 2\int \left(\left(\frac{3}{2}x^2 + x\right)\right)dx$$

Applying the additive rule of integration, we have $$\int\left(\left(\frac{3}{2}x^2+x\right)\right)dx = \int \frac{3}{2}x^2 dx + \int x\, dx$$

Factoring out, x-independent factor $$\int \frac{3}{2}x^2 dx = \frac{3}{2}\int x^2 dx$$
$$= \frac{3}{2}\frac{1}{3}x^3$$

$$\int x\, dx = \frac{1}{2}x^2$$

Summing-up all integrals, we obtain:

$$\int\left(\left(\frac{3}{2}x^2+x\right)\right)dx = \frac{3}{2}\frac{1}{3}x^3 + \frac{1}{2}x^2$$

Therefore $$\int 2\left(\frac{3}{2}x^2+x\right)dx = 2\left(\frac{3}{2}\frac{1}{3}x^3 + \frac{1}{2}x^2\right)$$

Applying the fundamental theorem of calculus, $$\int_0^1 2\left(\frac{3}{2}x^2+x\right)dx = 2\left(\frac{3}{2}\frac{1}{3}x^3 + \frac{1}{2}x^2\right)\Big|_{x=0}^1$$
$$= 2\left(\frac{3}{2}\frac{1}{3} + \frac{1}{2}\right) - (0)$$
$$= 2$$

Therefore, $\int_0^1 \int_0^2 \int_0^x (x+y+1) dy\, dz\, dx = 2$

Continuing with examples, Case H illustrates a line integral of scalar field.

Case H: Line Integral of Scalar Field[1]
Input:
begin
function rho;
rho(x,y)=x+y^2;
C={(x,y)|x=t,y=t, 0<t<i};
ds=sqrt(dx^2+dy^2);
m=$rho(x,y)ds@C;
end#
Interpreted Input:

$\rho(x,y)=x+y^2$ $C=\{(x,y)|x=t, y=t, 0<t<1\}$ $ds=\sqrt{(dx)^2+(dy)^2}$ $m=\int_C \rho(x,y) ds$ Output:

$\rho(x,y)=x+y^2$ $C=\{(x,y)|x=t, y=t, 0<t<1\}$ $ds=\sqrt{dx^2+dy^2}$ $$m = \sqrt{2}\frac{5}{6}$$

Intermediate Steps:

$\int_C \rho(x,y)\, ds$ is a line integral along curve C. To compute it, we need to first work out $\rho(x,y)$ and differential ds along the curve in terms of parameter t. Plugging x=t y=t from the curve definition into $\rho(x,y)$, we obtain $\rho(x,y)=t+t^2$ §To evaluate the definite integral $\int_0^1 (t+t^2)\sqrt{2}\, dt$, let's first work out the indefinite integral $\int(t+t^2)\sqrt{2}\, dt$. Factoring out t-independent factor $\int(t+t^2)\sqrt{2}\, dt = \sqrt{2}\int((t+t^2))dt$ Applying the additive rule of integration, we have $\int((t+t^2))dt = \int t\, dt + \int t^2 dt$ $$\int t\, dt = \frac{1}{2}t^2$$

$$\int t^2 dt = \frac{1}{3}t^3 = \frac{1}{3}t^3$$

Summing-up all integrals, we obtain:

$$\int((t+t^2))dt = \frac{1}{2}t^2 + \frac{1}{3}t^3$$

Therefore $$\int(t+t^2)\sqrt{2}\, dt = \sqrt{2}\left(\frac{1}{2}t^2 + \frac{1}{3}t^3\right)$$

Applying the fundamental theorem of calculus, $$\int_0^1 (t+t^2)\sqrt{2}\, dt = \sqrt{2}\left(\frac{1}{2}t^2 + \frac{1}{3}t^3\right)\Big|_{t=0}^1$$
$$= \sqrt{2}\frac{5}{6} - (0)$$
$$= \sqrt{2}\frac{5}{6}$$

Continuing with examples, Case J illustrates a line integral of vector field.

Case J: Line Integral of Vector Field—II[1]
Input:
begin
C={(x,y,z)|x=cos(t), y=sin(t), z=t, 0<t<pi};
F=y*i^^+x*j^^;
r=x*i^^+y*j^^+z*k^^;
N=$F*dr@C;
end#
Interpreted Input:

$C=\{(x,y,z)|x=\cos(t), y=\sin(t), z=t, 0<t<\pi\}$ $F=y\hat{i}+x\hat{j}$ $r=x\hat{i}+y\hat{j}+z\hat{k}$ $N=\int_C F\times dr$ Output:

$C=\{(x,y,z)|x=\cos(t), y=\sin(t), z=t, 0<t<\pi\}$ $F=y\hat{i}+x\hat{j}$ $r=x\hat{i}+y\hat{j}+z\hat{k}$ $N=(-2)\hat{j}$ Intermediate Steps:

$\int_C F\times dr$ is a line integral along curve C. To compute it, we need to first work out F and differential dr along the curve in terms of parameter t. Plugging $x=\cos(t)$ $y=\sin(t)$ $z=t$ From the curve definition into $(y\hat{i}+x\hat{j})$, we obtain $$F = y\hat{i} + x\hat{j}$$
$$= \sin(t)\hat{i} + \cos(t)\hat{j}$$

$$dr = dx\hat{i} + dy\hat{j} + dz\hat{k}$$
$$= \left(\frac{dx}{dt}\right)dt\hat{i} + \left(\frac{dy}{dt}\right)dt\hat{j} + \left(\frac{dz}{dt}\right)dt\hat{k}$$
$$= dt(-\sin(t)\hat{i} + \cos(t)\hat{j} + \hat{k})$$

Thus, we have $$F \times dr = dt \begin{vmatrix} \hat{i} & \hat{j} & \hat{k} \\ \sin(t) & \cos(t) & 0 \\ -\sin(t) & \cos(t) & 1 \end{vmatrix}$$
$$= dt\cos(t)\hat{i} + dt(-\sin(t))\hat{j} + dt\, 2\sin(t)\cos(t)\hat{k}$$

and $$\int_C F\times dr = \hat{i}\int_C \cos(t)\,dt +$$
$$\hat{j}\int_C (-\sin(t))\,dt +$$
$$\hat{k}\int_C 2\sin(t)\cos(t)\,dt$$

§To evaluate the definite integral $\int_0^\pi \cos(t)\,dt$, let's first work out the indefinite integral $\int \cos(t)dt$.

$\int \cos(t)dt = \sin(t)$

Applying the fundamental theorem of calculus, $$\int_0^\pi \cos(t)\,dt = \sin(t)|_{t=0}^\pi$$

-continued $$= (0) - (0)$$
$$= 0$$

§To evaluate the definite integral $\int_0^\pi \sin(t)dt$, let's first work out the indefinite integral $\int -\sin(t)dt$.

$\int \sin(t)dt = -\cos(t)$

Applying the fundamental theorem of calculus, $$\int_0^\pi -\sin(t)\,dt = \cos(t)|_{t=0}^\pi$$
$$= (-1) - (1)$$
$$= -2$$

§To evaluate the definite integral $\int_0^\pi 2\sin(t)\cos(t)\,dt$, let's first work out the indefinite integral $\int 2\sin(t)\cos(t)dt$. Factoring out t-independent factor $\int 2\sin(t)\cos(t)dt = 2\int \sin(t)\cos(t)dt$ To evaluate indefinite integral $\int \sin(t)\cos(t)dt$, let's try substitution $u=\sin(t)$ Thus $$\frac{du}{dt} = \cos(t)$$

and $$\int \sin(t)\cos(t)dt = \int u\,du$$
$$= \frac{1}{2}u^2$$

Substituting to $u=\sin(t)$ back to the result above gives $$\int \sin(t)\cos(t)dt = \frac{1}{2}\sin(t)^2$$

Therefore $$\int 2\sin(t)\cos(t)dt = 2\frac{1}{2}\sin(t)^2$$

Applying the fundamental theorem of calculus, $$\int_0^\pi 2\sin(t)\cos(t)\,dt = 2\frac{1}{2}\sin(t)^2\Big|_{t=0}^\pi$$
$$= (0) - (0)$$
$$= 0$$

Continuing with examples, Case K illustrates implicit differentiation.

Case K: Implicit Differentiation[1]
Input:
begin $$y\char`\^2-4*y=x\char`\^2*(x\char`\^2-4); \qquad (1.1)$$

calculate dy/dx from (1.1);
end#
Interpreted Input:

$$y^2-4y=x^2(x^2-4) \qquad (1.1)$$

calculate $$\frac{dy}{dx}$$

from 1.1.
Output:

$$y^2 - 4y = x^2(x^2 - 4)$$
$$\frac{dy}{dx} = \frac{2x(x^2-4) + x^3 2}{2y+4}$$

Intermediate Steps:
This is an implicit differentiation problem. The dependency between y and x is defined implicitly through the equation $$y^2-4y=x^2(x^2-4)$$

To compute derivative, $$\frac{dy}{dx}$$

let's take derivatives with respect to x for both sides of the above equation. Applying additive rule $$\frac{d}{dx}(u+v) = \frac{du}{dx} - \frac{dv}{dx}:$$
$$\frac{d}{dx}(y^2-4y) = \frac{d}{dx}(y^2) - \frac{d}{dx}(4y)$$
$$= 2y\frac{dy}{dx} - \frac{d}{dx}(4y)$$

$$\frac{d}{dx}(4y) = 4 \cdot \frac{d}{dx}(y)$$
$$= 4 \cdot \frac{dy}{dx}$$

Therefore $$\frac{d}{dx}(y^2-4y) = 2y\frac{dy}{dx} - 4\frac{dy}{dx}$$

Applying product rule $$\frac{d}{dx}(uv) = v\frac{du}{dx} + u\frac{dv}{dx}:$$

-continued $$\frac{d}{dx}(x^2(x^2-4)) = \frac{d}{dx}(x^2) \cdot (x^2-4) + \frac{d}{dx}((x^2-4)) \cdot x^2$$
$$= 2x \cdot (x^2-4) + x^2 \cdot \frac{d}{dx}((x^2-4))$$

The derivative of a constant or an independent variable is zero, thus $$\frac{d}{dt}((x^2-4)) = \frac{d}{dx}(x^2)$$
$$= 2x$$

Therefore $$\frac{d}{dx}(x^2(x^2-4)) = 2x \cdot (x^2-4) + x^3 2$$

Equating the expressions resulted from taking derivatives for both sides of the defining equation, we obtain $$2y\frac{dy}{dx} - 4\frac{dy}{dx} = 2x(x^2-4) + x^3 2$$

From which, we can solve for $$\frac{dy}{dx}:$$
$$\frac{dy}{dx} = \frac{2x(x^2-4) + x^3 2}{2y+4}$$

Continuing with examples, Case L illustrates a query of an attribute of a mathematical entity.
Case L: Query the Attribute of a Mathematical Entity[1]
Input:
begin
A=(cos(phi)−sin(phi))
(−sin(phi)cos(phi));
is A orthogonal?
end#
Interpreted Input:

$$A = \begin{pmatrix} \cos(\phi) & -\sin(\phi) \\ -\sin(\phi) & \cos(\phi) \end{pmatrix}$$

Is A orthogonal?
Output:

$$A = \begin{pmatrix} \cos(\phi) & -\sin(\phi) \\ -\sin(\phi) & \cos(\phi) \end{pmatrix}$$

No, A is not orthogonal.
Intermediate Steps:
A square matrix is orthogonal if its rows are mutually orthogonal, i.e., the scalar-product of any row with itself is 1, and the products with all other rows are zero:

$$\sum_{k=1}^{n} a_{ik} a_{jk} = \delta_{ij}$$

For i=1, j=1:

$$\sum_{k=1}^{n} a_{1k} a_{1k} = \cos(\phi)\cos(\phi) + (-\sin(\phi))(-\sin(\phi))$$
$$= \cos(\phi)^2 + \sin(\phi)^2$$
$$= 1$$

For i=1, j=2:

$$\sum_{k=1}^{n} a_{1k} a_{2k} = \cos(\phi)(-\sin(\phi)) + (-\sin(\phi))\cos(\phi)$$
$$= -\cos(\phi)\sin(\phi) - \sin(\phi)\cos(\phi)$$
$$\neq 0$$

Therefore the matrix is not; orthogonal.

Continuing with examples, Case M illustrates a surface integral of a vector field.

Case M: Surface Integral of Vector Field[1]
Input:
begin
S={(x,y,z)|z=x, 0<x<R, 0<y<x};
u=u__0*z*k^^;
n=((d/dx)z, (d/dy)z, −1);
Q=$(u.n^^)dS@S;
end#
Interpreted Input:

$S=\{(x,y,z)|z=x, 0<x<R, 0<y<x\}$ $u = u_0 z \hat{k}$ $n=((d/dx)z,(d/dy)z,(-1))$ $Q=\int_S u \cdot \hat{n} dS$ Output:

$S=\{(x,y,z)|0<x<R, 0<y<x, z=x\}$ $u = u_0 z \hat{k}$ $n=(d/dx)z\hat{i}+(d/dy)z\hat{j}+\hat{k}$ $$Q = -u_0 \frac{1}{3} R^3$$

Intermediate Steps:

$\int_S (u_0 z \hat{k}) \cdot \hat{n} dS$ is a surface integral on surface S. To evaluate it, we need to map the integrand $(u_0 z \hat{k}) \cdot n$ onto the surface and work out the differential area dS explicitly in terms of differential area on the xy-plane, i.e., dxdy. Substituting z=x from the surface definition into $(u_0 z \hat{k}) \cdot \hat{n}$, we have $(u_0 z \hat{k}) = u_0 x \hat{k}$ $((d/dx)z\hat{i}+(d/dy)z\hat{j}-\hat{k})=\hat{i}-\hat{k}$ and $$\hat{n} = \frac{1}{\sqrt{2}} \hat{i} - \frac{1}{\sqrt{2}} \hat{k}$$

Dot-product (or scalar-product) of two vectors can be calculated by multiplying like-components and then add them up, $$u \cdot \hat{n} = (u_x \hat{i} + u_y \hat{j} + u_z \hat{k}) \cdot (\hat{n}_x \hat{i} + \hat{n}_y \hat{j} + \hat{n}_z \hat{k})$$
$$= u_x \hat{n}_x + u_y \hat{n}_y + u_z \hat{n}_z$$
$$= (0)\left(\frac{1}{\sqrt{2}}\right) + (0)(0) + (u_0 x)\left(-\frac{1}{\sqrt{2}}\right)$$
$$= -u_0 x \frac{1}{\sqrt{2}}$$

thus, $$(u_0 z \hat{k}) \cdot \hat{n} = -u_0 x \frac{1}{\sqrt{2}}$$

The differential area dS on surface S is related to the differential area dxdy on the xy-plane through the following equation:

$dS = \sqrt{(\partial z/\partial x)^2 + (\partial z/\partial y)^2 + 1} \, dxdy$

Plugging z=x into the above equation, we obtain $dS = \sqrt{2} dxdy$.

Notice that the projection of the surface on the xy-plane is:

$D=\{(x,y)|0<x<R, 0<y<x\}$, we can express the surface integral as a double integral defined in region D as below:

$$\int_S (u_0 z \hat{k}) \cdot \hat{n} \, dS = \int\int_D \left(-u_0 x \frac{1}{\sqrt{2}}\right) dS$$
$$= \int\int_D (-u_0 x) dx dy$$

The double integral can be written as:

$\int_{x=0}^{R}\int_{y=0}^{x} -u_0 x dy dx = \int_{x=0}^{R}(\int_{y=0}^{x} -u_0 x dy)dx$ ÅTo evaluate the definite integral $\int_0^x -u_0 x dy$, let's first work out the indefinite integral $\int -u_0 x dy$.

$\int -u_0 x dy = -y u_0 x$

Applying the fundamental theorem of calculus, $$\int_0^x -u_0 x \, dy = (-y u_0 x)|_{y=0}^{x}$$
$$= (-x^2 u_0) - (0)$$

-continued
$$= -x^2 u_0$$

Å To evaluate the definite integral $\int_0^R -x^2 u_0 dx$, let's first work out the indefinite integral $\int -x^2 u_0 dx$. Factoring out x-independent factor $$\int x^2 u_0 dx = u_0 \int x^2 dx$$
$$= u_0 \frac{1}{3} x^3$$

Applying the fundamental theorem of calculus, $$\int_0^R -x^2 u_0 dx = \left(-u_0 \frac{1}{3} x^3\right)\Big|_{x=0}^R$$
$$= \left(-u_0 \frac{1}{3} R^3\right) - (0)$$
$$= -u_0 \frac{1}{3} R^3$$

Therefore, $$\int_S (u_0 z \hat{k}) \cdot \hat{n} dS = -u_0 \frac{1}{3} R^3$$

Continuing with examples, Case N illustrates a hybrid symbolic natural language assertion and command.
Case N: HSNL Assertion and Command[1]
Input:
begin
A=(x_0, y_0, z_0);
S={(x,y,z)|z=x^2+y^2, 0<x<inf, 0<y<x};
P is the tangent plane of S at x=0, y=h;
calculate the distance between P and A;
end#
Interpreted Input:

$$A=(x_0, y_0, z_0)$$

$$S=\{(x,y,z)|z=x^2+y^2, 0<x<\infty, 0<y<x\}$$

P is the tangent plane of S at x=0, y=h;
calculate the distance between P and A;
Output:

$$A = x_0 \hat{i} + y_0 \hat{j} + z_0 \hat{k}$$

$$S=\{(x,y,z)|0<x<\infty, 0<y<x, z=(x^2+y^2)\}$$

$$P=\{(x,y,z)|Ax+By+Cz+D=0, x \in \mathbb{R}, y \in \mathbb{R}\}$$

where
A=0

$$B = \frac{2h}{\sqrt{4h^2 + 1}}$$

$$C = -\frac{1}{\sqrt{4h^2 + 1}}$$

-continued
$$D = \frac{1}{\sqrt{4h^2 + 1}} h^2 - \frac{2h^2}{\sqrt{4h^2 + 1}}$$

The distance is:

$$\left| \frac{2h}{\sqrt{4h^2 + 1}} y_0 - \frac{1}{\sqrt{4h^2 + 1}} z_0 + \frac{1}{\sqrt{4h^2 + 1}} h^2 - \frac{2h^2}{\sqrt{4h^2 + 1}} \right|$$

Intermediate Steps:

The tangent plane of a surface at a given point (x', y', z') on the surface can be determined by the normal vector at the point from the fact that the normal vector is perpendicular to any line lies within the tangent plane, or equivalently, any vector pointing to any point on the plane (x,y,z) from the given point (see Figure below). i.e.

$$\hat{n} \cdot ((x-x')\hat{i} + (y-y')\hat{j} + (z-z')) = 0$$

The normal vector of a surface can be calculated from $$\hat{n} = \frac{\partial z / \partial x}{\sqrt{(\partial z / \partial x)^2 + (\partial z / \partial y)^2 + 1}} \hat{i} +$$
$$\frac{\partial z / \partial y}{\sqrt{(\partial z / \partial x)^2 + (\partial z / \partial y)^2 + 1}} \hat{j} -$$
$$\frac{1}{\sqrt{(\partial z / \partial x)^2 + (\partial z / \partial y)^2 + 1}} \hat{k}$$

From the definition of surface S $$z = x^2 + y^2$$

we have:

$$\frac{\partial z}{\partial x} = 2x$$
$$\frac{\partial z}{\partial y} = 2y$$

and $$\hat{n} = \frac{2h}{\sqrt{4h^2 + 1}} \hat{j} - \frac{1}{\sqrt{4h^2 + 1}} \hat{k}$$

Thus the equation describing the plane can be written as:

$$0(x - 0) + \frac{2h}{\sqrt{4h^2 + 1}} (y - h) + -\frac{1}{\sqrt{4h^2 + 1}} (z - h^2) = 0$$

or equivalently, $$Ax + By + Cz + D = 0$$

A=0

$$B = \frac{2h}{\sqrt{4h^2+1}}$$

$$C = -\frac{1}{\sqrt{4h^2+1}}$$

$$D = \frac{1}{\sqrt{4h^2+1}}h^2 - \frac{2h^2}{\sqrt{4h^2+1}}$$

The distance from a given point (x,y,z) to a plane can be calculated by first determining the intersection between the line that is parallel to the normal vector of the plane and passes the point, and then compute the distance between the point and the intersection. It can shown that the formula is as following:

$$d = \frac{|Ax+By+Cz+D|}{\sqrt{A^2+B^2+C^2}}$$

where A, B, C, D are the coefficients defining the plane. Plugging the coefficients defining the plane and the coordinates of the point $(x_0, y_0, z_0)$ into the formula, we obtain:

$$d = \left|\frac{2h}{\sqrt{4h^2+1}}y_0 - \frac{1}{\sqrt{4h^2+1}}z_0 + \frac{1}{\sqrt{4h^2+1}}h^2 - \frac{2h^2}{\sqrt{4h^2+1}}\right|$$

Figure 9:
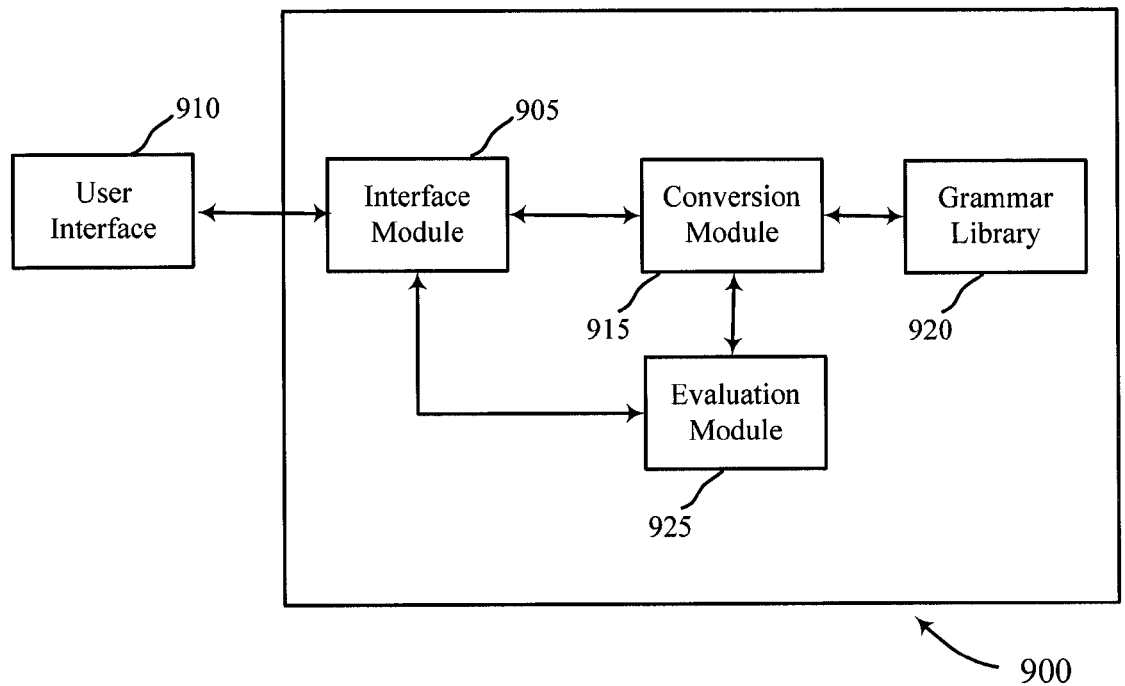
FIG. 9 illustrates a block diagram of an exemplary system according to an embodiment.
Figure 10:
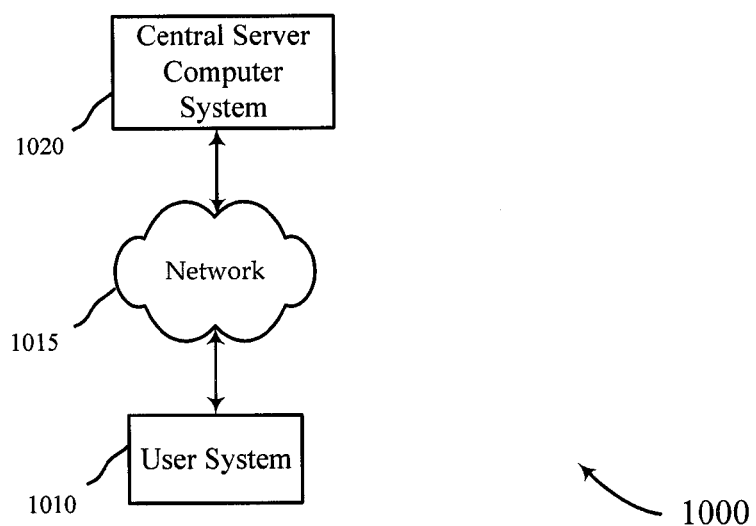
FIG. 10 shows a block diagram of an exemplary system according to another embodiment.
Figure 11A:
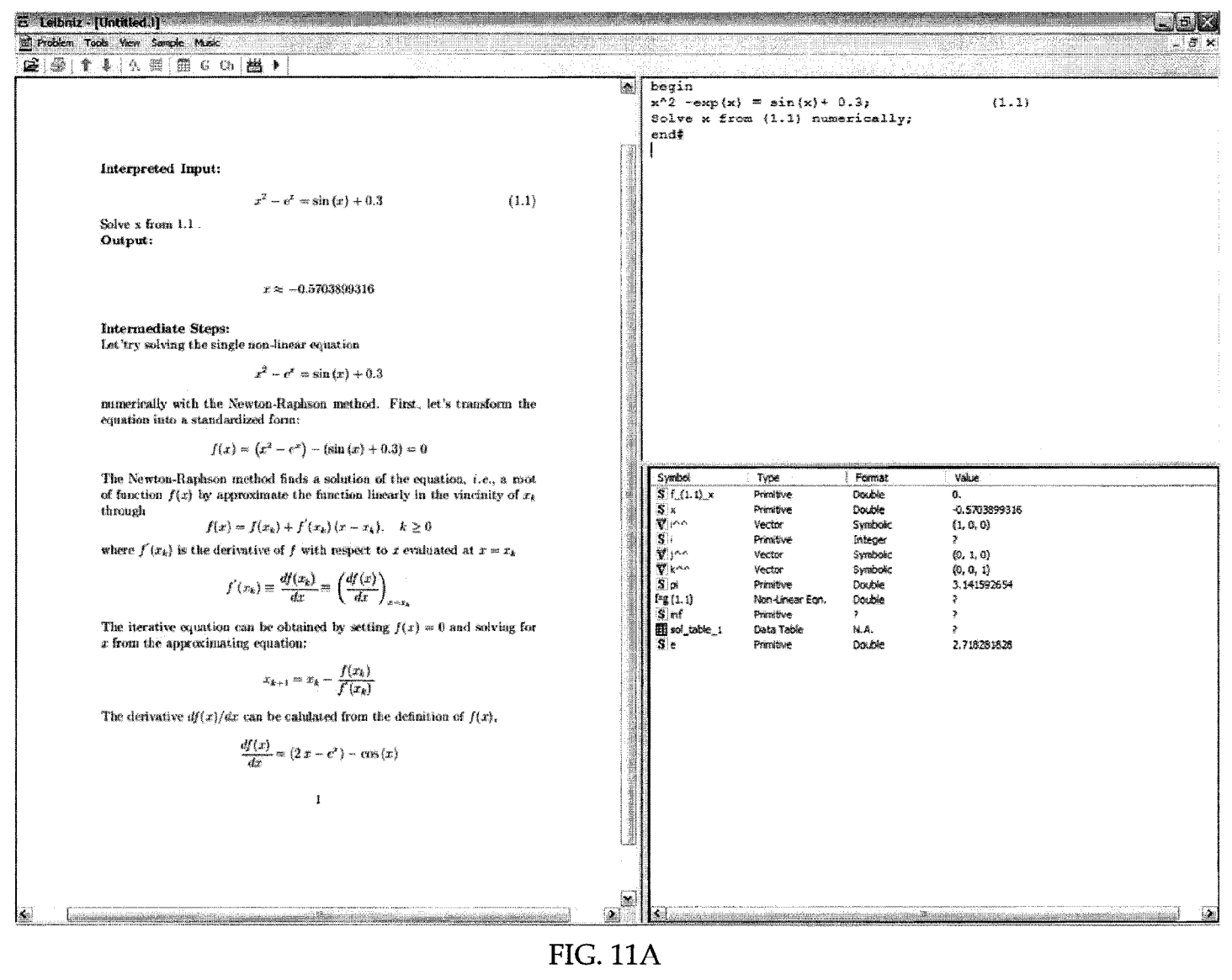
Figure 11B:
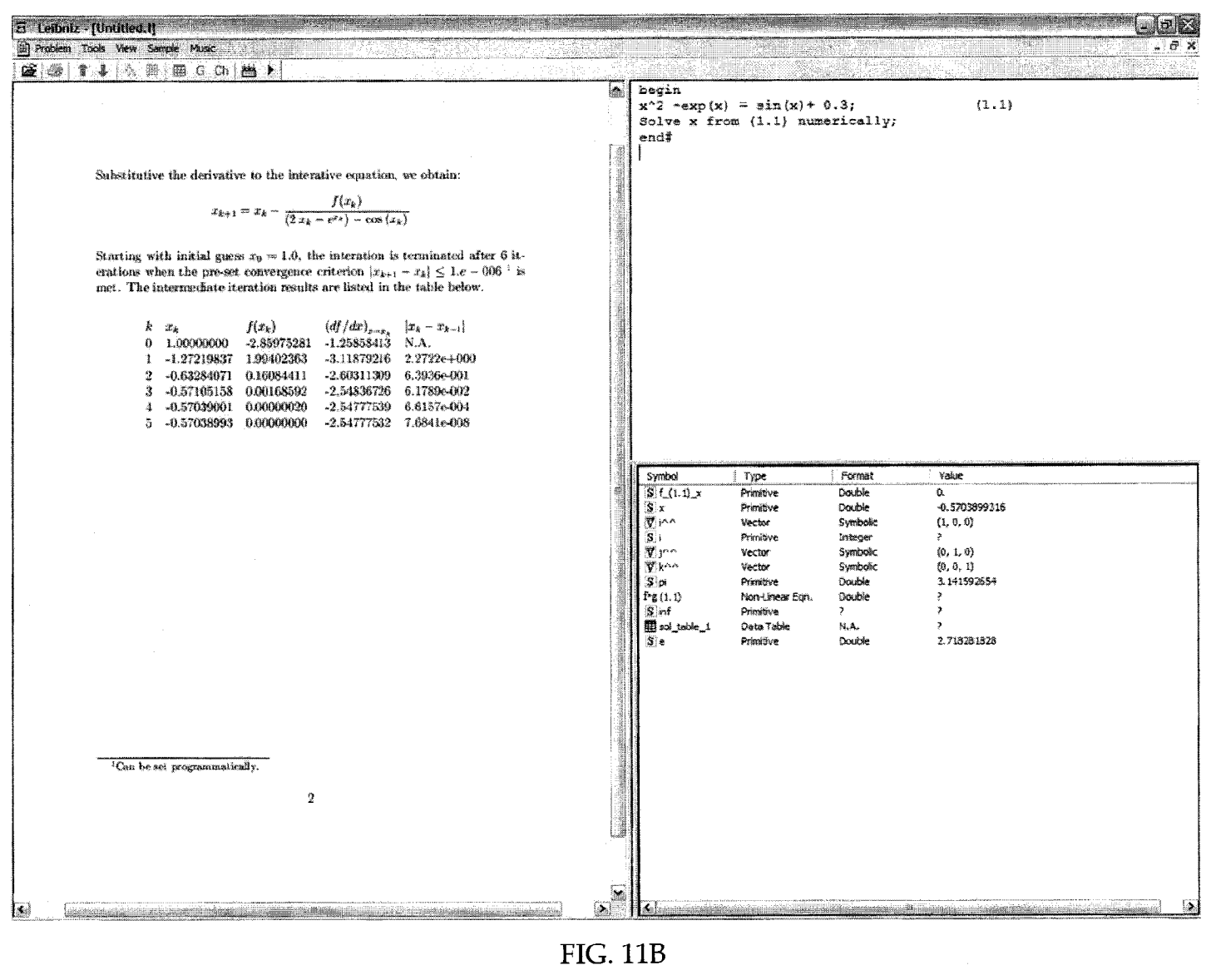
Figure 12A:
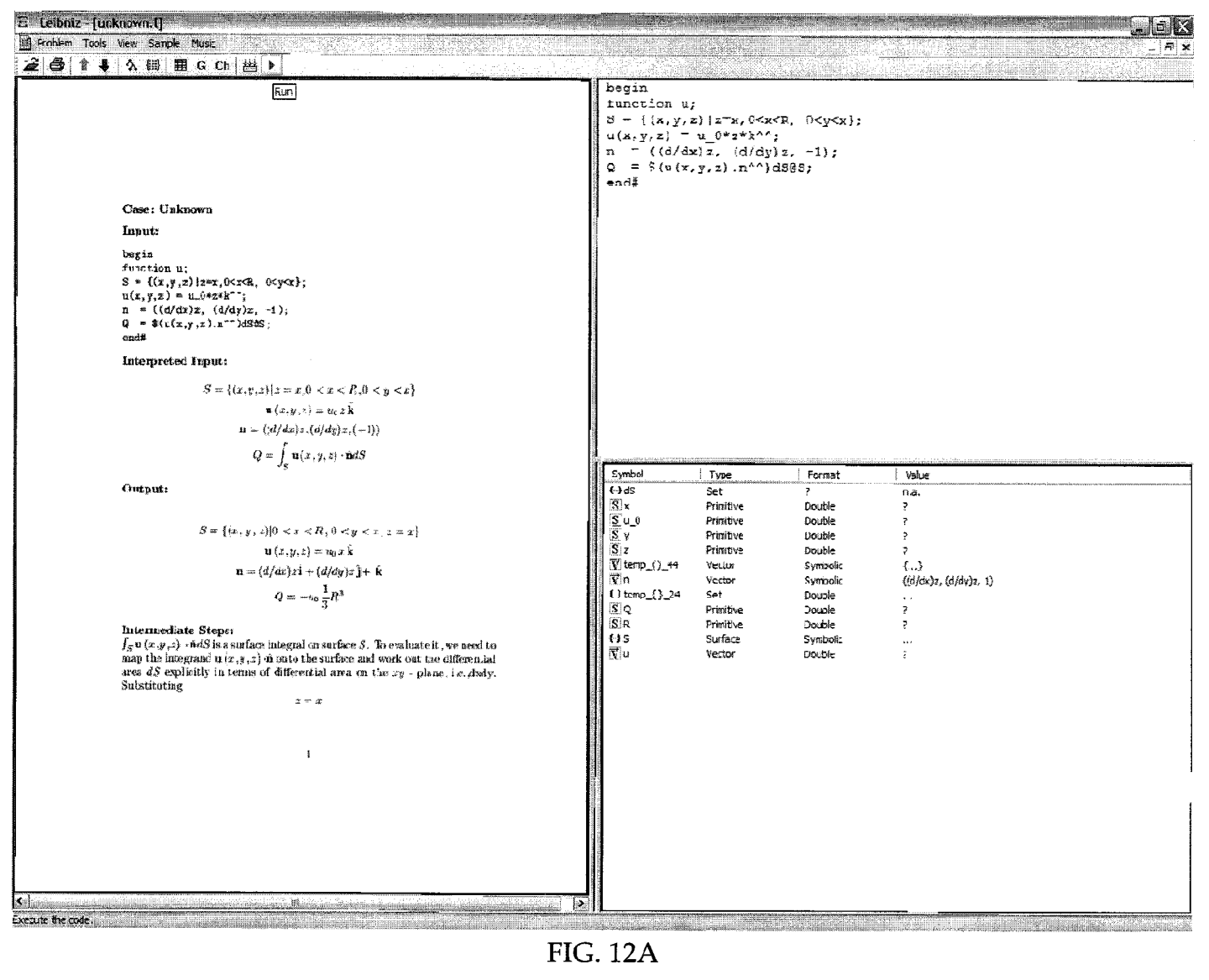
Figure 12B:
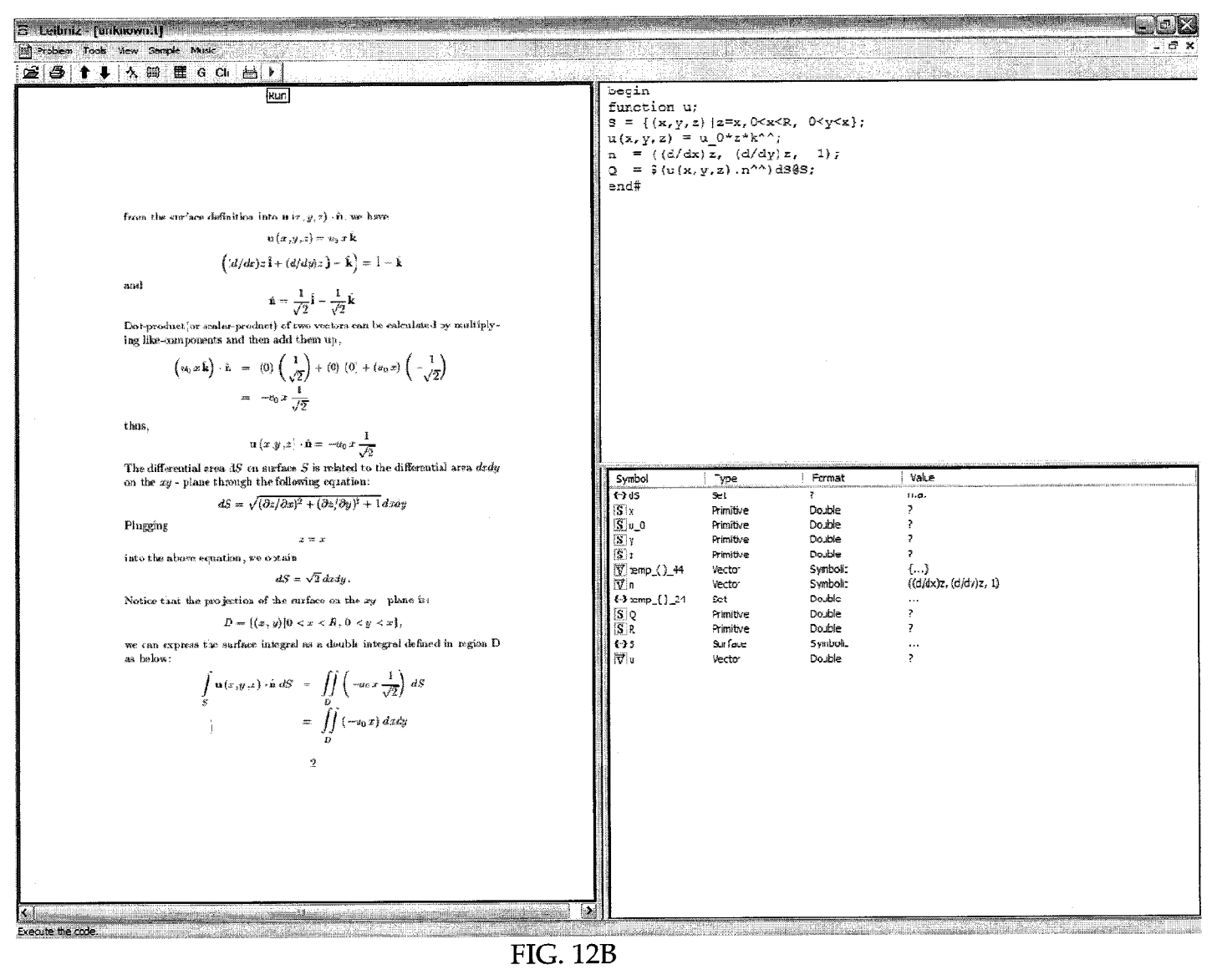
Figure 12C:
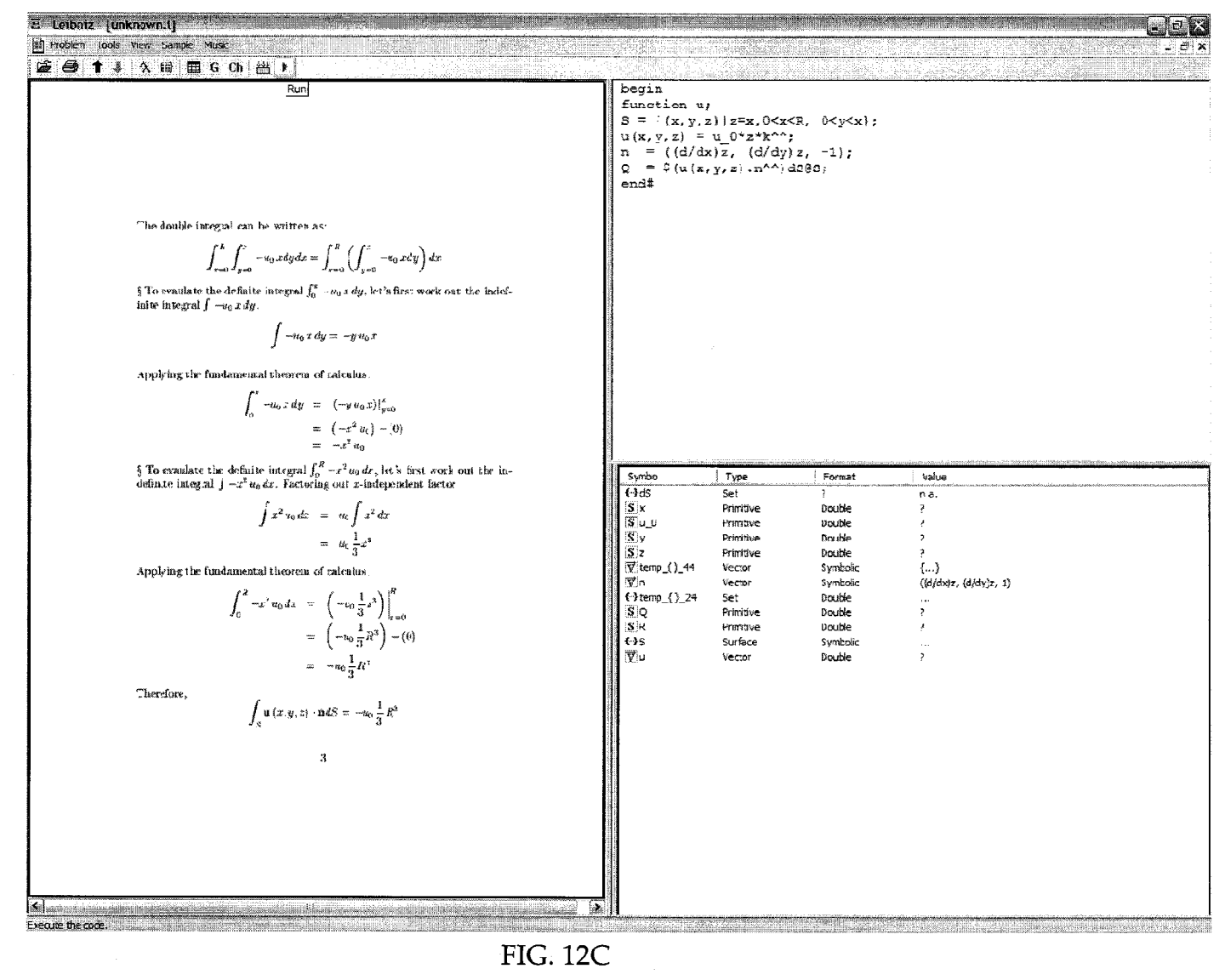

The above examples provide a number of exemplary inputs, outputs, and intermediate steps that may be displayed according to methods and systems of the present disclosure. With reference now to FIG. 9, an exemplary system 900 of an embodiment is described. The system includes an interface module 905, that may provide an interface between a user interface 910 and one or more other modules. The interface module 905 may include one or more communications interfaces on a computer system, for example, that interact with one or more of a monitor, keyboard, and/or mouse of user interface 910. A conversion module 915 is communicatively coupled to the interface module, and functions to convert received input into mathematical expressions and one or more ASTs. In order to perform conversion, the conversion module 915 accesses a grammar library 920, and evaluates received input relative to the grammar library to perform conversion functions. An evaluation module 925 evaluates the ASTs according to functions determined by the conversion module, and outputs results to the interface module 905. As mentioned above, the evaluation may be performed in intermediate steps, with the results of one or more intermediate steps output as well. In other embodiments, various functions of the interface module 905, conversion module 915, grammar library 920, and evaluation module 925 may be performed on a local system, or on a remote system connected to a local system through a network. Such a system 1000 is illustrated in FIG. 10. In the embodiment of FIG. 10, a user system 1010 is connected through a network 1015 to a central server computer system 1020, that may perform some or all of the functions described above. The network 1015 may a local or wide area network, such as the Internet. The user system 1010 may include any of a number of user devices, such as a personal computer, tablet computer, handheld device, or other mobile device as are well known. FIGS. 11 and 12 illustrate screen shots of exemplary outputs that may be provided to a user of such systems.

The detailed description set forth above in connection with the appended drawings describes exemplary implementations and does not represent the only examples that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts as described.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blue-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method for receiving and evaluating mathematical statements, comprising:
   receiving, at an interface module in a computer system, one or more one-dimensional mathematical statements including hybrid statements mixing mathematical expressions and natural language;
   converting, via at least one call to a grammar library stored in a memory of the computer system, portions of the one or more one-dimensional statements into a plurality of mathematical expressions and one or more abstract syntax tree (AST) connecting the expressions, wherein the grammar library includes rules enabling such converting;
   evaluating the mathematical expressions and performing operations on the expressions in accordance with the AST; and
   performing at least one of storing a result of the transformation in the memory or transmitting a result of the evaluation to the interface module.

2. The method of claim 1, wherein the one or more hybrid statements comprise ASCII character representations of a plurality of mathematical expressions linked together through ASCII character representations of one or more operators.

3. The method of claim 2, wherein the step of converting comprises recognizing at least one of leveling, asciilization, direct adoption, and operator transformation, present in one or more portions of the hybrid statements to obtain the plurality of mathematical expressions and one or more operators.

4. The method of claim 2, wherein the ASCII character representations comprise one or more of a "dy" that represents the differential of variable y, "$" that represents a integration operator, a "d/dx" that represents a derivative with respect to x, and a "{" that represents a set when paired with a "}" and represents the belong-to set operator when not paired with a "}".

5. The method of claim 2, wherein the ASCII character representations include labeling and reference of mathematical relations comprising one or more of equations, inequalities, and branched function definitions.

6. The method of claim 1, further comprising displaying a two-dimensional mathematical expression representing the one or more one-dimensional mathematical expressions.

7. The method of claim 1, wherein the step of evaluating comprises: evaluating the mathematical expressions and performing operations on the mathematical expressions in accordance with the AST of the expressions; displaying a two dimensional mathematical expression representing the results of the evaluation.

8. The method of claim 7, wherein displaying comprises generating a narrative of the operational steps representing the evaluation of the mathematical expressions, and displaying the narrative and the two dimensional mathematical expression representing the results of the evaluation.

9. The method of claim 1, wherein the AST is determined according to an instruction statement in the one or more hybrid statements.

10. The method of claim 9, wherein the instruction statement comprises one or more of an assertion instruction, command instruction, query instruction, and deduction instruction.

11. The method of claim 10, wherein the instruction statement comprises a "is a" assertion that corresponds to a predefined AST.

12. The method of claim 10, wherein the instruction statement comprises a "is the" assertion that that corresponds to a predefined AST.

13. The method of claim 10, wherein the instruction statement comprises a "descriptive" assertion that corresponds to a predefined AST.

14. The method of claim 10, wherein the instruction statement comprises a command instruction to determine the value of one or more mathematical entities from one or more labeled relations subject to one or more constraints.

15. The method of claim 10, wherein the instruction statement comprises a command instruction to determine an attribute that depends on one or more mathematical entities subject to one or more constraints such as spatial/temporal conditions or states of the entities.

16. The method of claim 10, wherein the instruction statement comprises a query instruction about an attributes or characterization of at least one mathematical entities under certain constraints such as spatial/temporal conditions or the states of the entities involved.

17. The method of claim 10, wherein the instruction statement comprises a deduction linking at least a first assertion to a second assertion, and wherein the step of evaluating further comprises combining information from one or more of the mathematical expressions and instruction statements, as well as general mathematical knowledge, according to conditions encoded in the first assertion to logically derive the second assertion.

18. A system for receiving and evaluating a mathematical statement, comprising:
    an interface module for receiving at least one one-dimensional hybrid statement mixing mathematical expressions and natural language from a user and providing one or more results of a mathematical evaluation to the user;
    a conversion module communicatively coupled to the interface module that converts at least portions of the one-dimensional hybrid statement into a plurality of mathematical expressions and one or more abstract syntax tree (AST) connecting the expressions;
    a grammar library communicatively coupled to the conversion module that comprises rules for converting one-dimensional hybrid statements into one or more mathematical expressions and one or more AST; and
    an evaluation module communicatively coupled to the conversion module and the interface module that evaluates some of the mathematical expressions and performs one or more operations on the mathematical expressions in accordance with the AST.

19. The system of claim 18, wherein the one or more hybrid statements comprise ASCII character representations of a plurality of mathematical expressions linked together through ASCII character representations of one or more operators.

20. The system of claim 19, wherein the ASCII character representations are selected to minimize the syntactical gap between the one-dimensional mathematical expressions the corresponding representation in natural math notation.

21. The system of claim 18, wherein the interface module is communicatively coupled with a user display, and provides a display of a two-dimensional mathematical expressions that may be embedded in sentence in natural language representing the received one-dimensional mathematical expressions.

22. The system of claim 21, wherein the evaluation module initially provides a two dimensional mathematical expression representing received one-dimensional hybrid statement to the interface module for display on the user display, provides a partial evaluation of the mathematical expressions in accordance with the AST for display on the user display, and provides a further evaluation the mathematical expressions in accordance with the AST to the user display.

23. The system of claim 18, wherein the conversion module determines the AST according to an instruction statement in the one or more hybrid statement.

24. The system of claim 23, wherein the instruction statement comprises one or more of an assertion instruction, command instruction, query instruction, and deduction instruction.

25. A computer program product comprising a non-transitory computer readable medium comprising:
    code for receiving one or more one-dimensional mathematical statements including hybrid statements mixing mathematical expressions and natural language;
    code for converting, via at least one call to a grammar library, portions of the one or more one-dimensional hybrid statements into a plurality of mathematical expressions and one or more abstract syntax tree (AST) connecting the expressions, wherein the grammar library includes rules enabling such converting;
    code for initially displaying a two dimensional mathematical expression representing the one or more one-dimensional mathematical expressions;
    code for evaluating the mathematical expressions and performing operations on the expressions in accordance with the AST; and
    code for displaying a two dimensional mathematical expression representing the results from the evaluations.

26. The computer program product of claim 25, wherein the one or more hybrid statements comprise ASCII character representations of a plurality of mathematical expressions linked together through ASCII character representations of one or more operators.

27. The computer program product of claim 25, wherein the AST is determined according to an instruction statement in the one or more mathematical statements including hybrid statements.

28. The computer program product of claim 27, wherein the instruction statement comprises one or more of an assertion instruction, command instruction, query instruction, and deduction instruction.

29. The computer program product of claim 28, wherein the instruction statement comprises a command instruction to determine the value of one or more mathematical expressions from one or more labeled relations in the hybrid statement based on relations and constraints for one or more of the mathematical expressions.

30. The computer program product of claim 28, wherein the instruction statement comprises a deduction instruction to deduce a certain property from one or more portions of the hybrid statement, or to manipulate one or more portions of the hybrid statement from a certain constraint and/or source based on an attribute having a mathematical expression with one or more constraints, and one or more constraints on the attribute.

31. The computer program product of claim 28, wherein the instruction statement comprises a query instruction about one or more of certain attributes and characterizations of at least a portion of the hybrid statement.

32. The computer program product of claim 28, wherein the instruction statement comprises a deduction linking at least a first assertion to at least a second assertion, and wherein the step of evaluating further comprises combining information from one or more of the mathematical expressions and instruction statements, as well as general mathematical information, according to conditions encoded in the first assertion to logically derive the second assertion.

33. A method for providing step-by-step explanations of symbolic and/or numerical computations and narratives associated with received mathematical statements, comprising:
    receiving, via an interface module in a computer system, one or more one-dimensional mathematical statements including hybrid statements mixing mathematical expressions and natural language, the statement(s) comprising at least one operator other than an addition, subtraction, multiplication, or division operator;
    converting, via at least one call to a grammar library stored in a memory of the computer system, portions of the one or more one-dimensional statements into a plurality of mathematical expressions and one or more abstract syntax tree (AST) connecting the expressions, wherein the grammar library includes rules enabling such converting;
    displaying the mathematical expressions via the interface module;
    receiving, via the interface module, a confirmation that the displayed mathematical expressions correctly identify the desired mathematical expressions;
    evaluating the mathematical expressions and performing operations on the expressions in accordance with the AST; and
    displaying, via the interface module, a two dimensional mathematical expression representing the results of the evaluation and a narrative of the operational steps representing the evaluation of the mathematical expressions.

34. The method of claim 33, wherein the AST is determined according to an instruction statement in the one or more hybrid statements.

35. The method of claim 34, wherein the instruction statement comprises one or more of an assertion instruction, command instruction, query instruction, and deduction instruction.

\* \* \* \* \*